United States Patent
Joye et al.

(10) Patent No.: US 12,517,975 B2
(45) Date of Patent: Jan. 6, 2026

(54) ENCRYPTED COMPUTATION COMPRISING A BLIND ROTATION

(71) Applicant: ZAMA SAS, Paris (FR)

(72) Inventors: Marc Francois Joye, Paris (FR); Michael Walter, Paris (FR)

(73) Assignee: ZAMA SAS, Paris (FR)

( * ) Notice: Subject to any disclaimer, the term of this patent is extended or adjusted under 35 U.S.C. 154(b) by 0 days.

(21) Appl. No.: 18/716,082

(22) PCT Filed: Nov. 24, 2022

(86) PCT No.: PCT/EP2022/083120
§ 371 (c)(1),
(2) Date: Jun. 3, 2024

(87) PCT Pub. No.: WO2023/104531
PCT Pub. Date: Jun. 15, 2023

(65) Prior Publication Data
US 2025/0036714 A1    Jan. 30, 2025

(30) Foreign Application Priority Data

Dec. 7, 2021 (EP) .................. 21290080
Aug. 11, 2022 (EP) .................. 22315182

(51) Int. Cl.
*G06F 17/14* (2006.01)
*H04L 9/00* (2022.01)

(52) U.S. Cl.
CPC .............. *G06F 17/144* (2013.01); *H04L 9/00* (2013.01); *H04L 9/008* (2013.01)

(58) Field of Classification Search
CPC ........... G06F 17/144; G06F 7/724–726; H04L 9/00; H04L 9/008; H04L 9/30; H04L 9/3026
See application file for complete search history.

(56) References Cited

U.S. PATENT DOCUMENTS

2019/0312728 A1    10/2019    Poeppelmann
2023/0171085 A1*    6/2023    Lee .................. H04L 9/008
                                                                    380/28

FOREIGN PATENT DOCUMENTS

CN    110870250        3/2020
EP    4087177 A1    11/2022
JP    2021-83039        5/2021

OTHER PUBLICATIONS

S. Halevi et al., An Improved RNS Variant of the BFV Homomorphic Encryption Scheme, Springer Nature Switzerland AG, 2019 (Year: 2019).*

(Continued)

*Primary Examiner* — Emily E Larocque
(74) *Attorney, Agent, or Firm* — NIXON & VANDERHYE P.C.

(57) ABSTRACT

Some embodiments are directed to a cryptographic encrypted computation method (400). The method involves performing a blind rotation of a ciphertext according to a test polynomial. The blind rotation results in an encrypted polynomial product of the test polynomial and a bootstrapping monomial represents the plaintext value as an exponent, modulo a modulus (q) and modulo a quotient polynomial (p(X)). . . . The quotient polynomial p(X) divides a number-theoretic transform (NTT) polynomial $X^M-1$ that allows a number-theoretic transform modulo the modulus q, e.g., q is a power of two and $p(X)=X^N+X^{N/2}+1$. The blind rotation is performed using the NTT, while the test polynomial is defined in such a way that the polynomial product is programmed to have desired output values for respective plaintext values as a fixed coefficient.

26 Claims, 4 Drawing Sheets

(56) References Cited

OTHER PUBLICATIONS

K. Kluczniak et al., FDFB: Full Domain Functional Bootstrapping Towards Practical Fully Homomorphic Encryption, arXiv: 2109.02731v1 [cs.CR], Sep. 6, 2021 (Year: 2021).*

Roy, Sujoy Sinha et al., "HEPCloud: An FPGA-Based Multicore Processor for FV Somewhat Homomorphic Function Evaluation", *IEEE Transactions on Computers*, vol. 67, No. 11, Nov. 2018.

Wikipedia, "Monomial", https://en.wikipedia.org/w/index.php?title=Monomial&oldid=1073638489, Sep. 20, 2024.

Martin R. Albrecht, et al., "On the concrete hardness of Learning with Errors", Journal of Mathematical Cryptology, vol. 9, No. 3, 2015, pp. 169-203 (42 pages).

Daniel J. Bernstein, "Multidigit Multiplication for Mathematicians", Mathematics Subject Classification, 2020, 19 pages.

Charlotte Bonte, et al., "FINAL: Faster FHE instantiated with NTRU and LWE", Intel Corporation, Emerging Security Lab, 24 pages, https://ia.cr/2022/074.

Ilaria Chillotti, et al., "CONCRETE: Concrete Operates oN Ciphertexts Rapidly by Extending TfhE", 6 pages, https://homomorphicencryption.org/wp-content/uploads/2020/12/wahc20_demo_damien.pdf.

Ilaria Chillotti, et al., "Programmable Bootstrapping Enables Efficient Homomorphic Inference of Deep Neural Networks", Cyber Security Cryptography and Machine Learning (CSCML 2021), vol. 12716 of Lecture Notes in Computer Science, downloaded Nov. 26, 2021, 14 pages.

Marc Joye, "Guide to Fully Homomorphic Encryption over the [Discretized] Torus", IACR, International Association for Cryptologic Research, Version 2.6, vol. 20211018:061637, Oct. 17, 2021, 39 pages.

Kamil Kluczniak, "NTRU-v-um: Secure Fully Homomorphic Encryption from NTRU with Small Modulus", CISPA Helmholtz Center for Information Security, Sep. 20, 2022, 30 pages.

Henri J. Nussbaumer, "Fast Polynomial Transform Algorithms for Digital Convolution", IEEE Transactions on Acoustics, Speech, and Signal Processing, vol. ASSP-28, No. 2, Apr. 1980, pp. 205-215 (11 pages).

Ron Rothblum, "Homomorphic Encryption: From Private-Key to Public-Key", Theory of Cryptography (TCC 2011), vol. 6597 of Lecture Notes in Computer Science, 2011, pp. 219-234 (16 pages).

Yang Su, et al., "FPGA-Based Hardware Accelerator for Leveled Ring-LWE Fully Homomorphic Encryption", IEEE Access, vol. 8, published Sep. 10, 2020, pp. 168008-168025 (18 pages).

Joachim Von Zur Gathen, et al., "Modern Computer Algebra", 3rd Edition, Cambridge University Press, 2013, 812 pages.

International Search Report and Written Opinion of the ISA for PCT/EP2022/083120 dated Mar. 15, 2023, 13 pages.

First Office Action, JP Application No. 2024-534003, Nov. 19, 2024.

Marc Joye et al, "Liberating TFHE: Programmable Bootstrapping with General Quotient Polynomials", $10^{th}$ Workshop on Encrypted Computing and Applied Homomorphic Cryptography (WAHC 2022), Nov. 7, 2022.

Yoshimasa Akimoto et al, "Speed-up of RNS type approximate homomorphic encryption by parallel processing: Bootstrapping in less than 1ms", Computer Security Symposium 2019, Oct. 21-24, 2019.

First Office Action, CN Application No. 202280081069.4, Nov. 25, 2024.

Search Report, CN Application No. 2022800810694, Nov. 19, 2024.

* cited by examiner

ENCRYPTED COMPUTATION COMPRISING A BLIND ROTATION

CROSS-REFERENCE TO RELATED APPLICATIONS

This application is the U.S. national phase of International Application No. PCT/EP2022/083120 filed Nov. 24, 2022 which designated the U.S. and claims priorities to EP patent application Ser. No. 21/290,080.7 filed Dec. 7, 2021, and EP patent application Ser. No. 22/315,182.0 filed Aug. 11, 2022, the entire contents of each of which are hereby incorporated by reference.

TECHNICAL FIELD

The presently disclosed subject matter relates to a cryptographic encrypted computation method, to a method of determining a test polynomial, to corresponding devices, and to a computer readable medium.

BACKGROUND

Homomorphic cryptography allows one to perform encrypted computations: computations, e.g., circuit evaluations, that are performed over encrypted data by a party without that party being able to decrypt. For example, input data and computation results may be received and returned in encrypted form. Intermediate data, e.g., an internal state of the computation, may also be in encrypted form.

Even though the result of the computation is returned in an encrypted form, when decrypted the output is expected to be the same, or very close to, as if the operations had been performed on the unencrypted data. Homomorphic encryption can be used for privacy-preserving outsourced storage and computation. This allows data to be encrypted and outsourced to a cloud environment for processing and/or storage, all while encrypted.

For example, homomorphic cryptography may be applied in fields such as health care in which privacy regulations may make it difficult to share plain data, but computations on encrypted medical data may be allowable. For example, a medical model developed, say, to classify medical data may be configured to receive medical data from a third party, say a hospital, in encrypted form. The medical model might, e.g., classify medical data, e.g., as normal or abnormal, or as having some particular medical syndrome, disease, or other disorder. Using homomorphic encryption, the medical model may be applied to medical data that is received in encrypted form. This means that the party that offers the medical model does not have access to the plain medical data that corresponds to the encrypted medical data. The user of the service can decrypt the result of the medical model application.

In particular, homomorphic cryptography techniques exist that can be used, at least in principle, to compute any function on encrypted data. Such techniques are referred to as "fully homomorphic encryption" (FHE) techniques.

Known implementations of FHE use noisy ciphertexts for security reasons. For example, encryption of a data item may comprise mapping the data item to a point in a key-dependent lattice, to which noise is added. In particular, many known implementations of FHE use LWE-type ciphertexts, whose security depends on the cryptographic hardness of the Learning With Errors problem. Such an LWE-type ciphertext may comprise one or more mask values (e.g., values modulo a certain modulus q, or torus elements), plus a body value which is derived from the mask values and from a plaintext using an encryption key, and which contains the noise. A variant of this is a GLWE-type ciphertext, that encrypts and uses polynomials instead of scalar values. Other known implementations of FHE use NTRU-type ciphertexts, for which the same considerations largely apply.

When a data item has just been encrypted the noise is low—the encryption is fresh. For example, the amount of noise is so low, that if a data item were to be decrypted, the noise can be removed at some point in the decryption process, e.g., by rounding. On the other hand, the noise should be high enough to make attacks on the system sufficiently hard. For example, in the hypothetical absence of noise, many homomorphic encryption schemes could be attacked with linear algebra, or other efficient algorithms, e.g., lattice reduction algorithms. When a data item is encrypted, noise is added that is chosen so that attacks are hard while homomorphic operations can still be performed and decryption is still possible.

Most homomorphic operations increase the noise that is inherent in a homomorphically encrypted data item. When many such operations are performed, the noise may reach a level such that unique decryption is no longer possible. Generally, it is known to use a technique called bootstrapping to reduce the noise of a homomorphically encrypted value. Bootstrapping may use a public key called a bootstrapping key. By using bootstrapping to reducing noise when needed, in principle it is possible to compute any desired number of homomorphic operations.

A particular class of fully homomorphic encryption schemes are the TFHE-like homomorphic encryption schemes. Such a scheme is described in I. Chillotti et al., "Programmable bootstrapping enables efficient homomorphic inference of deep neural networks", *Cyber Security Cryptography and Machine Learning* (CSCML 2021), vol. 12716 of Lecture Notes in Computer Science, pp. 1-19, Springer, 2021 (incorporated herein by reference). TFHE-like schemes differentiate themselves from other FHE schemes by supporting a comparatively very efficient technique for bootstrapping; in addition, they enable at the same time to evaluate a function during the bootstrap operation, referred to as programmable bootstrapping. The regular bootstrapping corresponds to a programmable bootstrapping with the identity function.

This programmable bootstrapping technique can reduce noise in a ciphertext (e.g., an LWE-type ciphertext) by performing a so-called blind rotation. The blind rotation may use a test polynomial $\overline{v}(X) = \overline{v}_0 + \overline{v}_1 X + \ldots + \overline{v}_{N-1} X^{N-1}$ defined such that each of its coefficients $\overline{v}_i$ encodes the desired output value corresponding to the scaled plaintext value i. The blind rotation may involve homomorphically evaluating a decryption (e.g., a LWE decryption) in an exponent of an encrypted bootstrapping monomial (e.g., GLWE-encrypted), resulting in an encrypted (e.g. GLWE-encrypted) polynomial product $\overline{v}(X) \cdot X^{-\tilde{\mu}^*}$ of the test polynomial $\overline{v}(X)$ and the bootstrapping monomial $X^{-\tilde{\mu}^*}$. The resulting polynomial product is encrypted as a ciphertext defined modulo the modulus $q=2^{\Omega}$ and the polynomial $X^N+1$, where N is a power of two. It may be ensured that the most significant bit of the scaled plaintext value is set to 0. In this case, the polynomial product $\overline{v}(X) \cdot X^{-\tilde{\mu}^*}$ has the desired output value for $-\tilde{\mu}^*$ as its constant coefficient. This is because the encryption is defined modulo the quotient polynomial $X^N+1$. Namely, because of this specific choice of quotient polynomial $X^N+1$, the identity $X^k = -X^{k+N}$ holds, so that $X^{-i} \cdot \overline{v} = X^{-i} \cdot (\overline{v}_0 + \overline{v}_1 X + \ldots + \overline{v}_{i-1} X^{i-1} + \overline{v}_i X^i + \overline{v}_{i+1} X^{i+1} + \ldots + \overline{v}_{N-1} X^{N-1}) = ($ $\overline{v}_0 \cdot X^{-i} + \overline{v}_1 X^{1-i} + \ldots + \overline{v}_{I-1} X^{-1} + \overline{v}_I + \overline{v}_{I+1} X^1 + \ldots + \overline{v}_{N-1} X^{N-1-i}) = \overline{v}_I - \overline{v}_0 \cdot X^{N-i} - \ldots + \overline{v}_{I+1} X^1 + \ldots$. The coefficient can then be extracted to obtain an encryption of the desired output value.

Interestingly, the output of the blind rotation has an amount of noise that is independent of the noise in the input ciphertext. Thus, by performing the programmable bootstrapping comprising the blind rotation, the noise in the input ciphertext can be reduced to a fixed amount, while possibly at the same time applying a function to the input ciphertext. By performing the programmable bootstrapping at appropriate times, it is possible to perform encrypted computations of unlimited multiplicative complexity.

The known programmable bootstrapping, and in particular its blind rotation, has a number of limitations. First, the blind rotation typically requires that the most significant bit of the scaled plaintext value is set to 0, in other words, the ratio of plaintexts for which a value can be programmed is only ½. Second, the known blind rotation requires to compute a large number of polynomial multiplications modulo the modulus $q=2^\Omega$ and the polynomial $X^N+1$, where N is a power of two. Such polynomial multiplications are computationally expensive, making the blind rotation and thereby the programmable bootstrapping still relatively expensive to compute.

SUMMARY

According to one aspect of the invention, a cryptographic encrypted computation method is provided, as defined by the claims. According to a further aspect of the invention, a method of determining a test polynomial for use in such an encrypted computation method is provided, as defined by the claims. According to further aspects, devices corresponding to these computer-implemented methods are provided, as defined by the claims. According to another aspect, a computer-readable medium is provided as defined by the claims.

The encrypted computation may involve performing a blind rotation of a ciphertext, e.g., an LWE-type ciphertext; for example, as part of a programmable bootstrapping. The ciphertext may encrypt a certain plaintext $\overline{\mu}^*$, e.g., a scaling of an original plaintext $\overline{\mu}$. The blind rotation may compute an encrypted polynomial product, e.g., $\overline{v}(X) \cdot X^{-\overline{\mu}^*}$, of a test polynomial $\overline{v}(X)$ and a bootstrapping monomial representing the plaintext value as an exponent, e.g., $X^{-\overline{\mu}^*}$, in a polynomial ring.

The blind rotation may involve computing a number of polynomial products in the polynomial ring. In the prior art, this polynomial ring is the ring $(\mathbb{Z}/q\mathbb{Z})[X]/(X^N+1)$ modulo the modulus q and the quotient polynomial $X^N+1$, where q and N are both powers of two. The inventors realized that, since polynomial products are a major part of the blind rotation, it would be beneficial to use more efficient techniques to compute the polynomial products in the blind rotation.

A technique that is known per se to perform efficient multiplications in polynomial rings, is the number-theoretic transform (NTT). To perform polynomial multiplications using the NTT, the polynomials may be represented in a so-called Fourier-domain representation of the NTT. Typically, a Fourier-domain representation of a polynomial comprises a number of respective evaluations of the polynomial in a number of respective evaluation points. When in Fourier-domain representation, the polynomials may be efficiently multiplied, e.g., by pointwise multiplication of the evaluations. Moreover, using the NTT, it is possible to efficiently compute the Fourier-domain representation of a polynomial from its coefficient representation (by applying the number-theoretic transform itself) and to efficiently compute a coefficient representation from the Fourier-domain representation (using the inverse number-theoretic transform). Various number-theoretic transforms are known per se, including the Discrete Fourier Transform (defined, in its standard form, for quotient polynomial $X^n-1$ and prime power modulus q with n|q−1), as disclosed e.g., in J. von zur Gathen and J. Gerhard, "Modern Computer Algebra", Cambridge University Press, 3rd edition, 2013, Chapter 8 (incorporated herein by reference insofar as the description of the DFT is concerned), Schönhage's algorithm and Nussbaumer's algorithm, as disclosed e.g. in D. J. Bernstein, "Multidigit multiplication for mathematicians", Unpublished manuscript, available at https://cr.yp.to/papers.html#m3, August 2001 (incorporated herein by reference insofar as the description of Schönhage's and Nussbaumer's algorithm is concerned).

Thus, performing a polynomial multiplication "using the number-theoretic transform" may generally refer to performing the polynomial multiplication in the Fourier domain of the number-theoretic transform, optionally combined with using the NTT and/or its inverse to convert polynomials from and to this Fourier-domain representation.

Unfortunately, the prior art blind rotation per se cannot be made more efficient by applying the number-theoretic transform. For efficiency reasons, the prior art uses modulus $q=2^\Omega$, for example $q=2^{32}$ or $q=2^{64}$. At the same time, quotient polynomial $X^N+1$ is used because this means that the relation $X^k=-X^{k+N}$ holds in the polynomial ring, which is necessary to make the prior art blind rotation work. However, with these parameters, applying the number-theoretic transform is not possible, since this would require that $X^N+1$ divides a polynomial $X^M-1$ where M is coprime to q. With the parameters used in the prior art, N and q are both powers of two, so no multiple of N can be coprime to q.

Moreover, using the prior art techniques, it is not possible to fully benefit from the improved performance provided by the number-theoretic transform by simply changing the parameters of the polynomial ring that is used. The quotient polynomial $X^N+1$ is needed because of the relation $X^k=-X^{k+N}$, as discussed above. The modulus $q=2^\Omega$ enables efficient modular arithmetic.

Interestingly, the inventors found a way to make blind rotation compatible with the number-theoretic transform. The inventors realized that it is not necessary to rely on the relation $X^k=-X^{k+N}$ to make the multiplication with the test polynomial work. Instead given a certain modulus and a certain quotient polynomial, it is possible to define a test polynomial such that the multiplication of the test polynomial and the bootstrapping monomial for a certain plaintext value, has a desired output value for that plaintext value as a fixed coefficient. In such a case, it is no longer the case that each respective coefficient of the test polynomial corresponds to a respective desired output value as was the case in the prior art, e.g., the test polynomial is different from $\overline{v}_0 + \overline{v}_1 X + \ldots + \overline{v}_{I-1} X^{i-1} + \overline{v}_I X^i + \overline{v}_{I+1} X^{i+1} + \ldots + \overline{v}_{N-1} X^{N-1}$. Still, using such a test polynomial in the blind rotation may result in an encrypted polynomial from which the desired output value can be extracted by extracting the fixed coefficient.

By using this improved test polynomial, it becomes possible to perform the blind rotation in a polynomial ring to which the number-theoretic transform applies. Specifically, the polynomial ring may be defined by a modulus q, which can for example be a power of 2, and by a quotient polynomial p(X), e.g., different from $X^N+1$. Here, the quotient polynomial may divide an NTT polynomial, namely, a polynomial that allows a number-theoretic transform modulo the modulus q. Typically, this means that the NTT polynomial is equal to $X^M-1$, where M is coprime to q. Given such a modulus and such a quotient polynomial, polynomial multiplication modulo the quotient polynomial may be implemented as a polynomial multiplication in the Fourier domain of the number-theoretic transform, e.g., as a polynomial multiplication modulo the NTT polynomial. Indeed, computing the polynomial multiplication modulo the NTT polynomial and reducing the result modulo the quotient polynomial may give the same result as performing the multiplication modulo the quotient polynomial, e.g., $a(X)b(X) \bmod p(X)=(a(X)b(X) \bmod (X^M-1)) \bmod p(X)$.

Accordingly, the blind rotation may be performed modulo the modulus q and modulo the quotient polynomial $p(X)$ dividing the NTT polynomial, and accordingly, polynomial multiplications of the blind rotation may be implemented using the number-theoretic transform. This way, efficiency of the blind rotation is improved compared to the known blind rotation. Moreover, since polynomial multiplication modulo the modulus and the quotient polynomial may occur in other operations of the encrypted computation as well, e.g., in a key switching that may optionally be performed as part of a programmable bootstrapping, these other operations can use the number-theoretic transform as well and can accordingly also be made more efficient.

In an embodiment, the modulus is a power of two, e.g., the modulus may be equal to $2^{32}$, $2^{64}$, or $2^{128}$. Thus, computations may be performed over the ring $\mathbb{Z}/q\mathbb{Z}$ where q is a power of two. Such a modulus may allow modular arithmetic (e.g., additions and/or multiplications) to be implemented particularly efficiently, e.g., using native instructions of the CPU. A power-of-two modulus is a particular example of a modulus for which the known blind rotation modulo the quotient polynomial $X^N+1$ cannot be implemented using the number-theoretic transform, since the degree of $X^M-1=(X^N+1)(X^N-1)$ is even and thus not coprime to q. By using a different quotient polynomial, e.g., $X^N+X^{N/2}+1$ in combination with a test polynomial as described herein interestingly, the NTT can be used with such q.

In an embodiment, the NTT polynomial is equal to $X^M-1$ for an integer M. M can be a power of two, or a product of powers of two and/or powers of three, for example. For such values of M, efficient number-theoretic transforms are known. The quotient polynomial $p(X)$ may be unequal to $X^N+1$, $N=M/2$. In this case, the relation $X^k=-X^{k+N}$ does not hold, but advantageously, using a test polynomial as described herein still allows the NTT to be used. For example, the quotient polynomial $p(X)$ may be a cyclotomic polynomial unequal to $X^N+1$, but it is also possible to use a quotient polynomial that is not equal to a cyclotomic polynomial.

In an embodiment, the degree N of the quotient polynomial is strictly larger than half the degree of the NTT polynomial M. For example, the quotient polynomial can be equal to $X^N+X^{N/2}+1$ or $X^N-X^{N/2}+1$, with the NTT polynomial being equal to $X^M-1$ for $M=3N/2$. This is particularly advantageous since it allows the blind rotation, and consequently also the programmable bootstrapping that it can be part of, to work for a wider range of plaintext values.

Specifically, the ciphertext to which the blind rotation is applied, is typically defined modulo the degree M of the NTT polynomial, e.g., plaintexts may take M possible values. For example, the ciphertext may be obtained by a blind rotation in which an input ciphertext is scaled to the degree M of the NTT polynomial. The blind rotation may be able to provide desired output values for N out of these M possible values. This is because the blind rotation is based on polynomial multiplications modulo the quotient polynomial, which has degree N. For example, in the prior art, M=2N and the blind rotation typically assumes that the most significant bit of the input plaintext is not set.

By selecting a degree N that is strictly larger than M/2, a proportion of plaintexts larger than one half can be programmed by the blind rotation. For example, quotient polynomial $X^N \pm X^{N/2}+1$ (e.g., where N is two times a power of three or four times a power of three), allows the proportion of programmable ciphertexts to be increased from one half to two thirds. Accordingly, the blind rotation and programmable bootstrapping may work on a wider range of input ciphertexts. For example, additional operations in the encrypted computation needed to ensure that the most significant bit of the input plaintext is not set, may be avoided, thus making the encrypted computation more efficient.

In an embodiment, the degree of the NTT polynomial is a product of powers of two and/or powers of three. In such cases, the number-theoretic transform is particularly efficient, making it particularly advantageous to use it. For example, the degree of the NTT polynomial can be a power of two. This is particularly efficient. The degree of the NTT polynomial can also be a power of three, which is advantageous because the degree of the quotient polynomial $p(X)$ can be set to two thirds of the degree of the NTT polynomial, e.g., $p(X)=X^N+X^{N/2}+1$ dividing NTT polynomial $X^{3N/2}-1$ allowing a large proportion of plaintext values to be programmed.

In an embodiment, the modulus q is prime, and the degree M of the NTT polynomial divides the modulus minus one. In this case, the field of integers modulo q contains a primitive Mth root of unity, allowing particularly efficient NTT techniques such as the discrete Fourier transform to be used. Depending on the modulus q, also modular arithmetic can be implemented efficiently, for example, computations modulo $2^{31}<q=10 \cdot 3^{18}+1<2^{32}$ or $2^{63}<q=4 \cdot 3^{39}+1<2^{64}$ can be implemented relatively efficiently using 32-bit, 64-bit and/or 128-bit arithmetic and are convenient because they match common data types.

In an embodiment, the quotient polynomial is equal to $X^N+X^{N/2}+1$ or $X^N-X^{N/2}+1$. As also discussed elsewhere, this choice of quotient polynomial is advantageous since it allows a relatively large proportion of plaintext values to be programmed. Moreover, for this choice of quotient polynomial, it is possible to particularly efficiently determine a test polynomial for a given set of desired output values. In particular, as described herein, each coefficient of the test polynomial may be computed from at most two desired output values, in particular as a sum where the two desired output values are possibly negated. Moreover, interestingly, the desired output value can be efficiently programmed at an arbitrary fixed coefficient, e.g., the coefficient can be different from the leading and constant coefficients. This can be beneficial for further operations of the encrypted computation in which further operations are applied to the encrypted polynomial resulting from the blind rotation prior to extracting the coefficient.

The test polynomial may be determined based on a lookup table defining desired output values for respective plaintext values. The inventors realized that, given the modulus, quotient polynomial $p(X)$, and NTT polynomial, it is in general possible to determine a suitable test polynomial for a given lookup table. In particular, the inventors realized that, for a quotient polynomial $p(X)$ that divides $X^M-1$ for an M, the inverse $X^{-1}$ of the polynomial X exists in $R[X]/(p(X))$ and can be expressed as a polynomial of degree<N with coefficients in R. This enables, for a given polynomial $v(X)=\Sigma_{i=0}^{N-1} v_i X^i \in R[X]/(p(X))$, to derive the following relation: $X^{-1} v(X)=\Sigma_{i=0}^{N-1} (v_{i+1}+(-p_0)^{-1}p_{i+1}v_0)X^i$, as an element of $R[X]/(p(X))$. Here, $v_N=0$. Effectively, multiplying a test polynomial $v(X)$ by a monomial $X^{-1}$ may thus correspond to adding a scaled version of the constant term of $v(X)$ to other coefficients and shifting. Based on this relation, it is possible to obtain an expression for the encrypted polynomial product of the test polynomial and the monomial representing the plaintext value that is part of the blind rotation. From the fact that such an expression can be obtained, it follows that it is possible to determine a test polynomial that has desired output values for respective plaintext values. Detailed examples are given herein, in particular for the case where the fixed coefficient is the constant or the leading coefficient, and for the case where the quotient polynomial is equal to $X^N+X^{N/2}+1$ or $X^N-X^{N/2}+1$. In these cases, the test polynomial can be computed particularly efficiently.

In an embodiment, the fixed coefficient is the constant coefficient or the leading coefficient. In this case, it is possible to determine the test polynomial for a given lookup table particularly efficiently by computing respective coefficients of the test polynomial from respective desired output values, e.g., a coefficient of the test polynomial may be computed as $$v_i \leftarrow \sum_{j=0}^{i} \frac{p_{i-j}}{p_0} K_j \text{ or} \quad (1)$$

$$v_i \leftarrow -\sum_{j=0}^{i} p_{i-j} K_{j+1} \quad (2)$$

and $v_{N-1}=K_0$, where $v_i$ is the coefficient for plaintext value i, $p_k$ is the kth coefficient of the quotient polynomial, and $K_j$ is the desired output value for plaintext value j.

In an embodiment, the ciphertext to which the blind rotation is applied, may be an LWE-type ciphertext. For example, the blind rotation may be part of an encrypted computation being carried out on LWE-type ciphertexts (e.g., without involving any NTRU-type ciphertexts). Or, the LWE-type ciphertext may be obtained by conversion from an NTRU-type ciphertext, e.g., as part of an encrypted computation that is carried out on NTRU-type ciphertexts. It is also possible to apply the blind rotation directly to a NTRU-type ciphertext without conversion to LWE. More generally, the ciphertext may be a lattice-type ciphertext whose security depends on the cryptographic hardness of a lattice problem, of which LWE and NTRU are two examples.

In an embodiment, performing the blind rotation may comprise computing one or more external products of ciphertexts with gadget ciphertexts. Such a gadget ciphertext may comprise multiple constituent ciphertexts, defined based on a gadget matrix. In the setting of LWE/GLWE, the gadget ciphertext may be a GGSW-type ciphertext. In the NTRU setting, gadget encryption is also referred to as NGS encryption, or as gadget NTRU. The gadget ciphertexts may be comprised in the bootstrapping key, e.g., may represent digits such as bits of a decryption key for decrypting the ciphertext to which the blind rotation is applied. The computation of such an external product typically involves a significant amount of polynomial multiplications modulo the modulus and the quotient polynomial. By using the provided techniques, these polynomial multiplications may be carried out using the number-theoretic transform, thus leading to a significant improvement in efficiency.

In an embodiment, the encrypted computation method may comprise performing a programmable bootstrapping. A modulus switching may be applied to an input ciphertext to obtain a further ciphertext, e.g., an LWE-type ciphertext. As known per se, this may involve scaling the input ciphertext to the degree of the NTT polynomial. The blind rotation may be performed on this further ciphertext. The blind rotation may be followed by a sample extraction in which an encryption of the fixed coefficient is extracted from the polynomial product computed by the blind rotation. The sample extraction may optionally be followed by a key switching. In particular, the encrypted computation method may be a "TFHE-like" encrypted computation method, of which the programmable bootstrapping is a core operation. Improving the blind rotation that this involves provides an important efficiency improvement in this setting.

In general, additional operations are possible between each of the steps of the programmable bootstrapping, e.g., several modulus-switched ciphertexts may be added together; the outputs of several blind rotations may be added prior to performing the sample extraction; etc. Various such operations may involve polynomial multiplications, e.g., modulo the quotient polynomial or modulo other polynomials that divide the NTT polynomial. In particular, the output of the blind rotation may comprise polynomials modulo the quotient polynomial to which additional polynomial multiplications may be applied prior to performing the sample extraction. In such cases, using the blind rotation as described herein also allows the NTT to be used for such additional polynomial multiplications, further improving the efficiency of the programmable bootstrapping.

In an embodiment, when performing the blind rotation using the number-theoretic transform, polynomials of the bootstrapping key may be used that are obtained not in a coefficient representation, but in a Fourier-domain representation of the number-theoretic transform. The blind rotation then does not include transforming these polynomials of the bootstrapping key from the coefficient representation to the Fourier-domain representation. For example, the polynomials may be received from another party or accessed from a storage in the Fourier-domain representation. This makes the blind rotation particularly efficient, since the transformation can be done beforehand. Since the bootstrapping key is typically generated once and then used many times, it is much more efficient to determine its Fourier-domain representation when generating it than when using it.

The encrypted computation may be a "TFHE-like" encrypted computation. Such a TFHE-like encrypted computation is characterized by the use of a programmable bootstrapping operation, in which an encrypted polynomial product is computed of a bootstrapping monomial representing the plaintext value as an exponent, and a test polynomial. In other words, the programmable bootstrapping may involve evaluating a decryption of a ciphertext in an exponent of an encrypted monomial. This evaluation may be computed using an external product with a gadget ciphertext of a bootstrapping key, e.g., a GGSW-type ciphertext, a NGS ciphertext, or a gadget NTRU ciphertext. Such a gadget ciphertext may comprise multiple constituent ciphertexts (e.g., GLWE-like ciphertext in the case of GGSW), and the computation of the external product may involve multiplying the respective constituent ciphertexts of the gadget ciphertext by respective polynomials. This programmable bootstrapping is made more efficient and/or more flexible in terms of accepted input plaintexts as described herein.

The provided techniques for improved computations on encrypted data may be applied in a wide range of practical applications. Such practical applications include the encrypted evaluation of software programs without having access to plain data. For example, one may evaluate medical diagnostic software on medical data without having actual access to said medical data. Medical data may comprise a medical image. A medical image may comprise, e.g., multi-dimensional image data, e.g., to two-dimensional (2D), three-dimensional (3D) or four-dimensional (4D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

In an embodiment, the provided techniques may be used to evaluate a neural network on encrypted inputs. The party evaluating the neural network may or may not have plaintext access to the trained parameters of the neural network, e.g., weights and biases. In general, the techniques provided herein, e.g., the improved polynomial multiplication, programmable bootstrapping, and external product, improve the efficiency of evaluating the neural network and/or reduce storage and transmission requirements for the used ciphertexts or key material.

An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the steps of an embodiment of the method when the computer program is run on a computer. Preferably, the computer program is embodied on a computer readable medium.

BRIEF DESCRIPTION OF DRAWINGS

Further details, aspects, and embodiments will be described, by way of example only, with reference to the drawings. Elements in the figures are illustrated for simplicity and clarity and have not necessarily been drawn to scale. In the figures, elements which correspond to elements already described may have the same reference numerals. In the drawings, FIG. 1a schematically shows an example of an embodiment of an encrypted computation device.

DESCRIPTION OF EMBODIMENTS

Figure 1A:
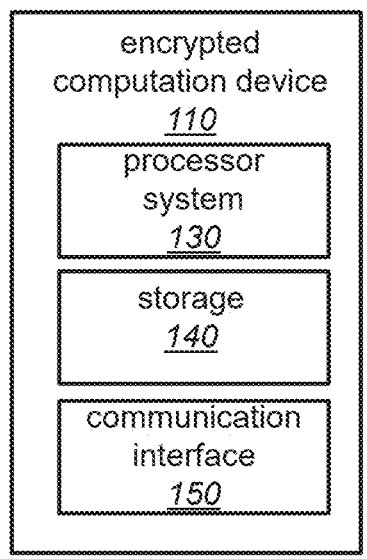
FIG. 1b schematically shows an example of an embodiment of a device for determining a test polynomial for use in an encrypted computation.
FIG. 1c schematically shows an example of an embodiment of an encrypted computation system.

While the presently disclosed subject matter is susceptible of embodiment in many different forms, there are shown in the drawings and will herein be described in detail one or more specific embodiments, with the understanding that the present disclosure is to be considered as exemplary of the principles of the presently disclosed subject matter and not intended to limit it to the specific embodiments shown and described.

In the following, for the sake of understanding, elements of embodiments are described in operation. However, it will be apparent that the respective elements are arranged to perform the functions being described as performed by them.

Further, the subject matter that is presently disclosed is not limited to the embodiments only, but also includes every other combination of features described herein or recited in mutually different dependent claims.

Generally, various embodiments relate to LWE (Learning With Errors)-type ciphertexts. In particular, a programmable bootstrapping may obtain an LWE-type input ciphertext encrypting a plaintext value as input and output an LWE-type output ciphertext encrypting a desired output value for the plaintext. An LWE-type ciphertext may comprise one or more mask values and a body value which is derived from the mask values and the plaintext value.

The LWE-type input and output ciphertext may be defined modulo a modulus q. As disclosed in "Programmable Bootstrapping Enables Efficient Homomorphic Inference of Deep Neural Networks", the values of an LWE-type ciphertext may be regarded as elements of the discretized torus $q^{-1}\mathbb{Z}/\mathbb{Z}$, or equivalently, as integers modulo q. As a concrete example, an LWE-type ciphertext $c \leftarrow \text{LWE}_s(\mu) = (a_1, \ldots, a_n, b) \in (\mathbb{Z}/q\mathbb{Z})^{n+1}$ encrypting a plaintext value $\mu \in \mathbb{Z}/q\mathbb{Z}$ under a secret key $s = (s_1, \ldots, s_n) \in \mathbb{B}^n$ may be computed as random mask values $a_j \leftarrow^\$ \mathbb{Z}/q\mathbb{Z}$ and body value $b = \Sigma_{j=1}^n s_j a_j + \mu^*$, with $\mu^* = \mu + e$ for random noise value e. In the above example, B denotes the binary set $\mathbb{B} = \{0,1\}$. Other variants exist, e.g., the secret key does not necessarily need to contain bits, e.g., see European patent application EP21290025 (incorporated herein by reference).

It is noted that the LWE-type ciphertext to which the blind rotation is applied as described herein, is typically defined modulo a modulus M that is equal to the degree of the NTT polynomial that is used in the blind rotation. For example, this ciphertext may be obtained by performing a modulus switching to scale an LWE-type input ciphertext modulo a further modulus q (e.g., corresponding to the modulus of the coefficients of the polynomials used in the blind rotation) to this modulus M.

Various embodiments also relate to GLWE (Generalized Learning With Error)-type ciphertexts. A GLWE-type ciphertext may comprise one or more mask polynomials, and a body polynomial which is derived from the mask polynomials and a plaintext polynomial. A GLWE-type ciphertext may be defined modulo a modulus q and a quotient polynomial p(X) e.g. of degree greater than one.

For example, let $\mathbb{Z}_{N,q}[X]=(\mathbb{Z}/q\mathbb{Z})[X]/(p(X))$. For a secret key $s \leftarrow^{\$} \mathbb{B}_N[X]^k$, a GLWE-type ciphertext $c=(a_1, \ldots, a_k, b) \in \mathbb{Z}_{N,q}[X]^{k+1}$ encrypting a plaintext $\mu \in \mathbb{Z}_{N,q}[X]$ may be computed as mask polynomials $a_j \leftarrow^{\$} \mathbb{Z}_{N,q}[X]$ and body polynomial $b=\Sigma_{j=1}^{k} s_j a_j + \mu^*$ with $\mu^* = \mu + e$ for random noise polynomial e. An LWE-type ciphertext is an example of a GLWE-type ciphertext where (N,k)=(1,n). Another example of a GLWE-type ciphertext is a Ring Learning With Errors (RLWE)-type ciphertext. A RLWE-type ciphertext comprises only one mask polynomial.

Instead of using LWE/GLWE-type ciphertexts, it is also possible to use different lattice encryptions. For example, the ciphertext to which the blind rotation is applied, and/or the encrypted polynomial product that results from it, may be NTRU ciphertexts. For example, a NTRU encryption of a message µ may be defined by adding a quotient of a noise polynomial g and a private key polynomial f to the message, e.g., $f \in \mathbb{Z}_{N,q}[X]$ may be an invertible polynomial (typically with small coefficients); and the NTRU encryption may be given by $c=g/f+\mu \in \mathbb{Z}_{N,q}[X]$, or, writing $g=e_1+f \cdot e_2$, by $c=e_1/f+\mu+e_2$. In particular, an NTRU ciphertext may comprise only a single polynomial. Security of such ciphertexts may be based on the NTRU assumption.

In particular, NTRU may be used in combination with the provided techniques by using a blind rotation that results in an NTRU-encrypted polynomial product of a test polynomial and a bootstrapping monomial, and/or by applying a blind rotation to an NTRU ciphertext as input. Examples of suitable NTRU encryptions are defined in C. Bonte et al., "FINAL: Faster FHE instantiated with NTRU and LWE", https://ia.cr/2022/074; and K. Kluczniak, "NTRU-v-um: Secure Fully Homomorphic Encryption from NTRU with Small Modulus", https://ia.cr/2022/089.

Various embodiments also relate to gadget ciphertexts. Generally, a gadget ciphertext may be defined as a ciphertext that comprises multiple constituent ciphertexts encrypting respective values based on a plaintext, and which may be defined based on a gadget matrix. For LWE/GLWE, the gadget ciphertext can be a GGSW-type ciphertext as defined e.g. in the "Programmable bootstrapping enables . . . " reference (incorporated herein insofar as the description of GGSW is concerned). In the NTRU setting, as gadget encryption can for example be used: the NGS encryption of C. Bonte et al., "FINAL: Faster FHE instantiated with NTRU and LWE", https://ia.cr/2022/074 (incorporated herein by reference insofar as the definition of NGS is concerned); or the gadget NTRU encryption of K. Kluczniak, "NTRU-v-um: Secure Fully Homomorphic Encryption from NTRU with Small Modulus", https://ia.cr/2022/089 (incorporated herein by reference insofar as the definition of gadget NTRU is concerned).

The above examples describe (G)LWE/NTRU/ . . . ciphertexts according to a symmetric encryption scheme (e.g., one secret key is used both for encryption and decryption), but it is also possible for the used ciphertexts to be according to asymmetric encryption scheme (e.g., different public and private keys are used for encryption and decryption, respectively). For example, the above secret key may be used as the private key, wherein the public key comprises one or more encryptions of zero, e.g., see R. Rothblum, "Homomorphic encryption: From private-key to public-key", *Theory of Cryptography* (TCC 2011), vol. 6597 of Lecture Notes in Computer Science, pp. 219-234, Springer, 2011 (incorporated herein by reference).

Various embodiments use the number-theoretic transform to perform polynomial multiplications modulo a modulus q and a quotient polynomial p(X) that divides an NTT polynomial. Typically, the NTT polynomial is equal to $X^M-1$ and the quotient polynomial divides the NTT polynomial, e.g., trivially divides it by being equal, or strictly divides it. The modulus q may be selected such that M is a unit in $\mathbb{Z}/q\mathbb{Z}$, preferably, such that $\mathbb{Z}/q\mathbb{Z}$ comprises a primitive root of unity of order M. In such cases, polynomial multiplication in the Fourier domain of the number-theoretic domain can be implemented particularly efficiently, e.g., as a pointwise multiplication of evaluations of the multiplicands in powers of the primitive root of unity. Techniques for this are known per se, e.g. from J. von zur Gathen and J. Gerhard, "Modern Computer Algebra", Cambridge University Press, 3rd edition, 2013. The term "primitive root of unity" is used throughout this specification as defined in this reference.

For example, the quotient polynomial may be any quotient polynomial p(X) dividing $X^M-1$, and the Fourier representation of a polynomial may be defined as a set of evaluations of the polynomial in a set of powers of the primitive Mth root of unity. The Fourier representations may be multiplied by pointwise multiplication of the evaluations in the respective powers of the primitive Mth root of unity. For efficient conversion between the coefficient representation and Fourier domain representation of a polynomial, it is advantageous if M contains one or more powers of two and/or one or more powers of three, e.g., M is a power of two or M is a power of three.

The Fourier representation of the polynomial can comprise evaluations in each of the powers of the root of unity, but this is not necessary. In various cases, it suffices to use a subset of the powers, leading to a more efficient Fourier-domain representation. This is in particular the case if the quotient polynomial is equal to $(X^M-1)/(X^d-1)$, where M=hd and d=M-N (and thus N=M-d=(h-1)d). For example, the quotient polynomial may be $(X^{2d}-1)/(X^d-1)=(X^d+1)=(X^N+1)$ for the case h=2 or $(X^{3d}-1)/(X^d-1)=(X^{2d}+X^d+1)=(X^N+X^{N/2}+1)$ for the case h=3. In such cases, the Fourier domain representations of a polynomial may be defined as evaluations of the polynomial in only a subset of the powers of a primitive Mth root of unity ω, for example, the powers $\omega, \omega^3, \ldots, \omega^{2d-1}$ for the case h=2 and in the powers $(\omega, \omega^2)(\omega^4, \omega^5), \ldots, (\omega^{3d-2}, \omega^{3d-1})$ for the case h=3. To multiply the polynomials, only the evaluations for this subset of powers of the root of unity suffice, leading to a more efficient polynomial multiplication. Still, an efficient number-theoretic transform and inverse are possible.

The described techniques relate to a blind rotation using a bootstrapping key. Encrypted computation techniques supporting such a blind rotation may be referred to as "TFHE-like" homomorphic encryption schemes.

The programmable bootstrapping operation in TFHE-like schemes makes them an appealing choice for a wide range of applications. Because bootstrapping is relatively efficient compared to many other FHE schemes, it is much more feasible to perform relatively complex computations, e.g., with a multiplicative depth of at least 10, at least 50, or at least 100. In particular, the cryptographic parameters of TFHE-like schemes can be selected based on the required precision and resulting computational cost, independently from the quantity of homomorphic operations and their circuit depth. In other FHE schemes, in contrast, bootstrapping can be so inefficient that, in practice, these schemes are typically applied in a levelled way, meaning that their parameters are selected depending on a given computation such that it can be performed without the need for bootstrapping. Such a levelled approach is not feasible for more complex computations, however, so in such cases, TFHE-like schemes are particularly beneficial.

For example, a bootstrapping key of a TFHE-like encryption scheme may comprise n gadget, e.g., GGSW-type, ciphertexts encrypting key digits of an e.g. LWE secret key, where typically n is at most 1000 or at most 640, e.g., n=630. A gadget ciphertext may for example comprise l=3 ciphertexts, each comprising k=1 mask polynomial (e.g., RLWE may be used) and one body polynomial in the case of GLWE. Further example parameters are discussed throughout. Generally, the security of GLWE-based ciphertexts is based on the distribution of the secret key, and on three main parameters: n=kN, where N is the degree of the quotient polynomial, k is the number of random mask polynomials of a ciphertext, and n is the length of the secret key; q, the modulus; and σ, the statistical parameter of the noise, e.g., its standard deviation. Given these parameters, it is known per se how to estimate a degree of security that is provided, see, e.g., M. Albrecht et al., "On the concrete hardness of Learning with Errors", Journal of Mathematical Cryptology, 9(3):169-203, 2015 (incorporated herein by reference). Likewise, for NTRU-based ciphertexts, which are typically made of a single polynomial, the security is based on the distribution of the secret key, and on two main parameters: N, the degree of the quotient polynomial; and σ, the statistical parameter of the noise.

In embodiments herein, the parameters of TFHE-like (e.g., LWE/GLWE) ciphertexts that are used may be selected based on a desired security level and based on a desired accuracy of operations such as linear combination of ciphertexts and/or applying a programmable bootstrapping, in other words, a noise level resulting from applying these operations. Interestingly, in the TFHE setting, security parameters may be selected independently of the computational complexity, e.g. independently of the multiplicative depth of the computation. This is unlike for non-TFHE-like schemes, where the security parameters are typically chosen to limit or eliminate bootstrappings.

In particular, LWE-based ciphertexts and/or GLWE-based ciphertexts used in the TFHE setting herein may use a relatively small modulus, e.g., of at most 32 bits, at most 64 bits, or at most 128 bits. This modulus is typically selected independent from the computation to be carried out, e.g., it is selected depending on a desired precision and/or efficiency. Parameters N, k, and/or σ may be selected to achieve a desired security level, also typically independently from the computation to be carried out. For example, N may be set to at least 512 and/or at most 2048 or 4096, e.g., to 1024. For example, in an embodiment, RLWE is used with N at least 512 and/or at most 2048 or 4096, e.g., 1024, and k=1. Such values for N are not typically used in non-TFHE-like encryption schemes, where such values would severely restrict the computations that can be performed; instead, in non-TFHE-like schemes, q and N are typically both selected based on the desired security level, such that q may be much larger.

FIG. 1a schematically shows an example of an embodiment of an encrypted computation device 110.

Device 110 may comprise a processor system 130, a storage 140, and a communication interface 150. Storage 140 may comprise local storage, e.g., a local hard drive or electronic memory. Storage 140 may comprise non-local storage, e.g., cloud storage. In the latter case, storage 140 may comprise a storage interface to the non-local storage. For example, storage 140 may be for storing an LWE-type ciphertext on which to perform a programmable bootstrapping or a blind rotation.

Storage 140 may further be for storing a bootstrapping key for use in a blind rotation. The blind rotation may use the bootstrapping key to perform LWE decryption in an exponent of a bootstrapping monomial. The bootstrapping key may be stored in a Fourier domain representation of the number-theoretic transform used in the blind rotation, improving its efficiency.

As an alternative to LWE, also NTRU can be used, for example.

Device 110 may communicate internally, with other devices, external storage, input devices, output devices, and/or one or more sensors over a computer network. The computer network may be an internet, an intranet, a LAN, a WLAN, etc. The computer network may be the Internet. The device may optionally comprise connection interface 150 which is arranged to communicate with other devices as needed. For example, the connection interface may comprise a connector, e.g., a wired connector, e.g., an Ethernet connector, an optical connector, etc., or a wireless connector, e.g., an antenna, e.g., a Wi-Fi, 4G or 5G antenna. Communication, e.g., internal communication, may use other communication protocols or media, e.g., an internal data bus.

In device 110, the communication interface 150 may be used to send or receive digital data. For example, device 110 may be configured to receive or send data representing an LWE-type ciphertext, e.g., an input to the blind rotation or programmable bootstrapping, or its output. The communication interface 150 may be further used to receive data representing the bootstrapping key. The bootstrapping key may be received in a Fourier domain representation of the NTT used in the blind rotation.

The execution of device 110 may be implemented in a processor system 130, e.g., one or more processor circuits, e.g., microprocessors, examples of which are shown herein. Device 110 may comprise multiple processors, which may be distributed over different locations. For example, device 110 may use cloud computing.

Processor system 130 may be configured to obtain an LWE-type ciphertext encrypting a plaintext value, e.g., to receive it or to compute it by performing an encrypted computation. Processor system 130 may be configured to perform a blind rotation of the LWE-type ciphertext according to a test polynomial. The blind rotation may result in an encrypted polynomial product of the test polynomial and a bootstrapping monomial modulo a modulus and modulo a quotient polynomial. The bootstrapping monomial may represent the plaintext value as an exponent. The quotient polynomial may divide an NTT polynomial that allows a number-theoretic transform modulo the modulus. Processor subsystem 130 may be configured to perform a polynomial multiplication of the blind rotation using the number-theoretic transform. The test polynomial may be defined such that the polynomial product has a desired output value for the plaintext value as a fixed coefficient. Processor system 130 may be further configured to output the computed encrypted polynomial product, e.g., for use in the encrypted computation. For example, processor system 130 may compute an LWE encryption representing an output of the encrypted computation based on the computed encrypted polynomial product, and output the LWE encryption e.g. by storing it on storage 130 and/or sending it to another party via communication interface 150.

As an alternative to LWE, also NTRU can be used, for example.

Some of the figures show functional units that may be functional units of the processor system. For example, a figure may be used as a blueprint of a possible functional organization of the processor system. The processor circuit(s) are not shown separate from the units in most figures. For example, the functional units shown in FIGS. 2 and 3 (see below) may be wholly or partially implemented in computer instructions that are stored at a device such as device 110, e.g., in an electronic memory of device 110, and are executable by a microprocessor of device 110. In hybrid embodiments, functional units are implemented partially in hardware, e.g., as coprocessors, e.g., arithmetic and/or cryptographic coprocessors, and partially in software stored and executed on device 110.

For example, device 110 may be a device for performing an encrypted computation. The encrypted computation may use homomorphic encryption cryptography. For example, the device 110 may be used to perform an encrypted computation, e.g., the device may perform the computation even though said data is received in encrypted form, e.g., from a data provider, and even though the device 110 is not able to decrypt the data. The computation may involve the blind rotation as described herein, for example, as part of a programmable bootstrapping.

For example, storage 140 may store encrypted data items, e.g., received from one or more data providers or generated as intermediate results or end results, e.g., outputs, of the computation. Typically, most or all data items on which the computation of device 110 is performed, are encrypted with a key (or keys) that is not known to device 110—that is device 110 may not be configured to obtain the plain data items corresponding to the encrypted data items, e.g., such as stored in storage 140. The decryption key in plain form is secret for device 110, though the encryption/decryption key may be available in encrypted form. For example, the processor system may be configured to perform a sequence of homomorphic encryption operations, which may include arithmetic operations on encrypted values such as addition and multiplication, and which may further include one or more blind rotations, e.g., as part of respective programmable bootstrapping operations.

Figure 1B:
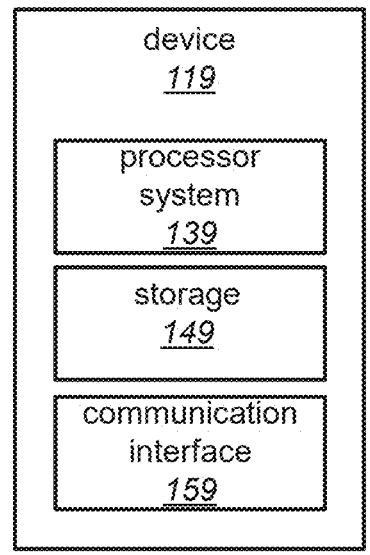

FIG. 1b schematically shows an example of an embodiment of a device 119 for determining a test polynomial for use in an encrypted computation, e.g., for use by device 110 of FIG. 1a. The encrypted computation may comprise computing a polynomial product of a bootstrapping monomial and a test polynomial modulo a modulus and modulo a quotient polynomial, with the quotient polynomial dividing an NTT polynomial. Device 119 may perform the encrypted computation itself, e.g., device 110 of FIG. 1a may be combined with device 119 of FIG. 1b.

Device 110 may comprise a processor system 139, a storage 149, and a communication interface 159. Processor system 139, storage 149, and communication interface 159 may be implemented as discussed for the respective components of FIG. 1a. Storage 149 may be for storing a lookup table defining desired output values for respective plaintext values. The lookup table can be stored for example by storing respective output values, respective pairs of input values, or another representation of a function mapping inputs to outputs, e.g., a symbolic or executable representation.

Communication interface 159 may be used to receive the lookup table and/or one or more system parameters such as the modulus, the quotient polynomial and the NTT polynomial. Communication interface 159 may be used to send the computed test polynomial.

Processor system 139 may be configured to obtain the modulus, the quotient polynomial, and the NTT polynomial. Processor system 139 may be further configured to compute the test polynomial such that the polynomial product has the respective desired output values as a fixed coefficient for the respective plaintext values.

Figure 1C:
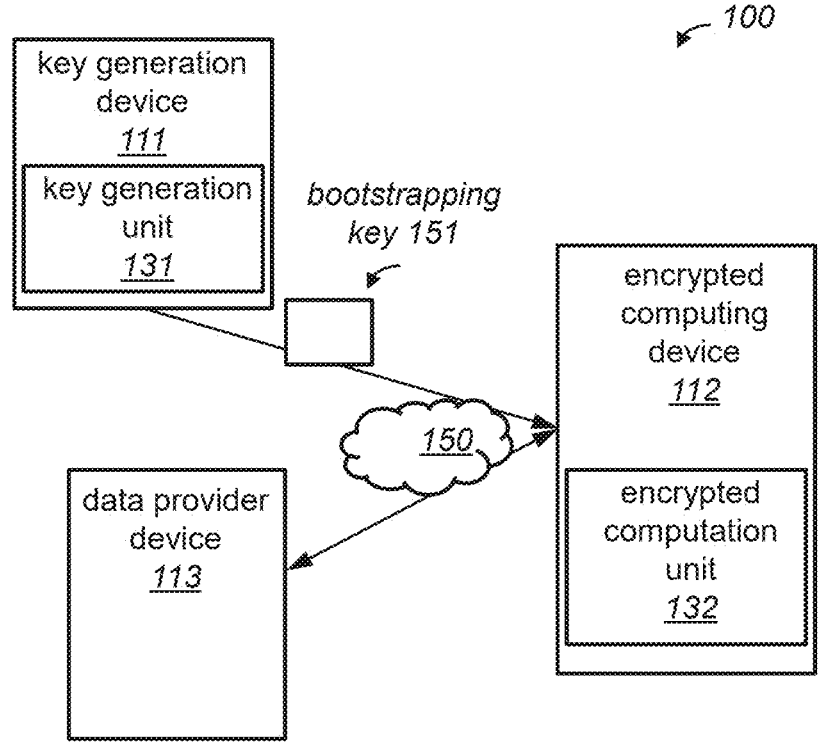

FIG. 1c schematically shows an example of an embodiment of an encrypted computation system 100. System 100 is configured for performing an encrypted computation using homomorphic encryption, e.g., fully homomorphic encryption.

The system 100 in this example comprises a key generation device 111, a data provider device 113 and an encrypted computing device 112. Key generation device 111 and data provider device 113 may be combined in a single device. Device 112 may be configured to receive encrypted data items from a data provider 113. At least one or more data items may be received in encrypted form. One or more further data items may be received in plain format. The computation is run on the received data items and possibly also on stored data items. Interestingly, the computation may be performed on the encrypted data, without decrypting the data, e.g., without converting encrypted data items to data in a plain format.

Device 112 in this example may be based on device 110 of FIG. 1a, e.g., may comprise processor system 130, storage 140, and/or communication interface 150 of FIG. 1a. Each of the devices 111, 112, 113 may be based on device 119 of FIG. 1b, e.g., may each comprise processor system 139, storage 149, and/or communication interface 159 of FIG. 1b.

In this example, device 111 comprises a key generation unit 131, e.g., implemented by a processor system of the device 111. Key generation unit 131 is configured to generate a bootstrapping key 151 for use by encrypted computing device 112. The bootstrapping key may allow to perform a blind rotation, as described herein. Device 111 may provide the bootstrapping key 151 to device 112, e.g., send it via computer network 150, upload it to a shared storage, etc. Device 111 may provide polynomials of the bootstrapping key in a Fourier domain representation of a number-theoretic transform.

In this example, device 112 comprises an encrypted computation unit 132, e.g., implemented by a processor system of the device 112. Encrypted computation unit 132 may be configured to carry out the encrypted computation. The encrypted computation may involve a blind rotation of an e.g. LWE-type ciphertext e.g. as described for device 110 of FIG. 1a. To perform the blind rotation, the encrypted computation unit 132 may use the bootstrapping key 151 that it has obtained from device 111, e.g., received via network 150 or retrieved from a shared storage. The blind rotation may use a test polynomial. The test polynomial may be determined from a lookup table by device 111, device 112, or device 113, e.g., as described for device 119 of FIG. 1b. The encrypted computation may comprise many other operations, as known per se, e.g., device 112 may be configured to evaluate an arithmetic circuit, to evaluate a neural network on encrypted data, etc.

Although not shown in this figure, the encrypted computation system 100 may comprise multiple encrypted computing devices, e.g., two, three or more than three. The encrypted computation may be distributed among the multiple encrypted computing devices. The encrypted computing devices may exchange intermediate computation results, typically encrypted, among each other. Each encrypted multiplication device may be implemented like encrypted computing device 112, and may perform multiplications of ciphertexts by polynomials as described herein.

Homomorphic encryption schemes can be applied in many settings. For example, encrypted computing device 112 may be operated by a cloud provider. The cloud provider may offer computation and storage services to its clients. By employing homomorphic encryption, data provider device 113, e.g., a client of the cloud provider, can send their data in encrypted form. The cloud provider can still perform the required computations, and/or the required storage, but is not able to know the corresponding to plain data. For example, data provider device 113 may use an encryption key of a type corresponding to the particular homomorphic encryption system used to encrypt the data items. When computations results are received by data provider 113 from encrypted computing device 112, a corresponding decryption key may be used to decrypt the encrypted data items. Encryption and decryption keys may be the same—and typically are so.

For example, encrypted computation system 100 may be configured to train machine-learning models, e.g., image classifiers, e.g., medical models, without the encrypted computing devices having access to the plain data items. For example, linear regression may be performed on the input data, possibly, even without bootstrapping. For example, back-propagation may be performed on the input data, possibly, with bootstrapping. The resulting model parameters may be returned to an entity who is in possession of the decryption key. This enables multiple providers of medical data to pool their data, by sending the data to a cloud provider. The cloud provider then returns the model parameters, without ever having access to the plain data. Encryption keys may be equal to decryption keys.

After the model is trained, the encrypted computation system 100 may be used to offer the model, say, for use with medical data. This can be done with plain model parameters or encrypted model parameters—in both cases with encrypted data, e.g., encrypted input, intermediate and output data. Using plain model parameters is usually much more efficient. In both cases, an effect of the system is that a computation is performed, say an image classification, e.g., a medical image classification, without the computer knowing the plain data items. For example, a mammogram may be evaluated for cancer, without the image ever being in the plain at an encrypted computing device 112 and without any encrypted computing device 112, or a coalition of such devices, knowing what the outcome of the cancer evaluation is. From a privacy point of view it may be acceptable to operate a plain model on encrypted privacy sensitive data, while it might not be acceptable to operate on plain privacy sensitive data.

Other applications involve database services, e.g., looking up encrypted data in an encrypted database; for example, the computation may be a comparison between an input item and a database item. For example, multiple computations may be combined to produce a database index that matches an index. For example, the database, may be a genomic database, and the input a gene sequence. For example, system 100 may be used for protected control of a device. For example, a device, even a large device such as a power plant, may send sensor values to an encrypted computing device 112, and receive encrypted control signals in return. The control signals being computed from the sensor signals. An attacker of the system may be able to determine the contents of data going to and from one or more encrypted computing devices 112, or even gain access to intermediate data of these devices, but he will not be helped by that as the data is encrypted. Even a full break of all encrypted computing devices 112 of a system 100 will not reveal the data, as the decryption key is not known to these devices. Computing the control signal may involve such mathematical operations as linear algebra, averages, matrix multiplication, polynomial evaluations, and so on, all of which are possible to execute with homomorphic encryption operations.

For example, a pool of encrypted data items may be maintained in the encrypted computation system; a subset of these may be received and another subset may be the result of an encrypted computation, e.g., intermediate results. For example, an encrypted computing device 112 may be configured to apply a homomorphic encryption operation to one, two or more encrypted data items in a pool, e.g., a collection of input and/or intermediate and/or output values. The result may be a new encrypted data item that may be stored in the pool. The pool may be stored in a storage of the encrypted computation system. This may be local storage or a distributed storage. In the latter case, it may happen that one or more encrypted data items are represented multiple times in the pool. Encrypted data items may be sent from one computing device to another, e.g., if their values are needed elsewhere. The pool may be implemented in various ways, e.g., as a register file, an array, various data structure, and so on.

The encrypted data items may represent all kinds of data. For example, encrypted data items may represent numbers that need to be averaged, or which are used for linear regression, etc. For example, the encrypted data items may represent an image. For example, each pixel of the image may correspond to one or more encrypted data items. For example, a grey-scale pixel may be represented by a grey level, which in turn may be represented by a single encrypted data item. For example, 256 grey levels may be encoded in a single encrypted data item. For example, a colour pixel may be represented as multiple colour levels, e.g., RGB levels, which in turn may be represented by a tuple of encrypted data items. For example, three 256-level colours may be encoded in three encrypted data items. How many encrypted data items are used to represent some type of data depends on the capacity of the homomorphic encryption scheme. For example, more restrictive homomorphic encryption schemes may only be capable of encoding one bit per encrypted data item. In that case, one colour pixel, may require 24 encrypted data items.

A set of homomorphic encryption operations may be defined for the computation. For example, from the homomorphic encryption operations a network or circuit of operations may be built that together implement the computation, e.g., by an external compiler device or by the computation device itself. For example, the operations may include Boolean operations. The way the homomorphic encryption operations are combined, e.g., which operation is applied to which operand in the pool, determines the computation that is being performed. For example, the computation may be represented as a list of homomorphic encryption operations that are to be performed together with an indication on which encrypted data item they are to be performed. The network or circuit may indicate to the encrypted computation device 112 when to carry out a blind rotation and/or programmable bootstrapping and may include the test polynomial or a lookup table from which the test polynomial can be computed as described herein.

Figure 2:
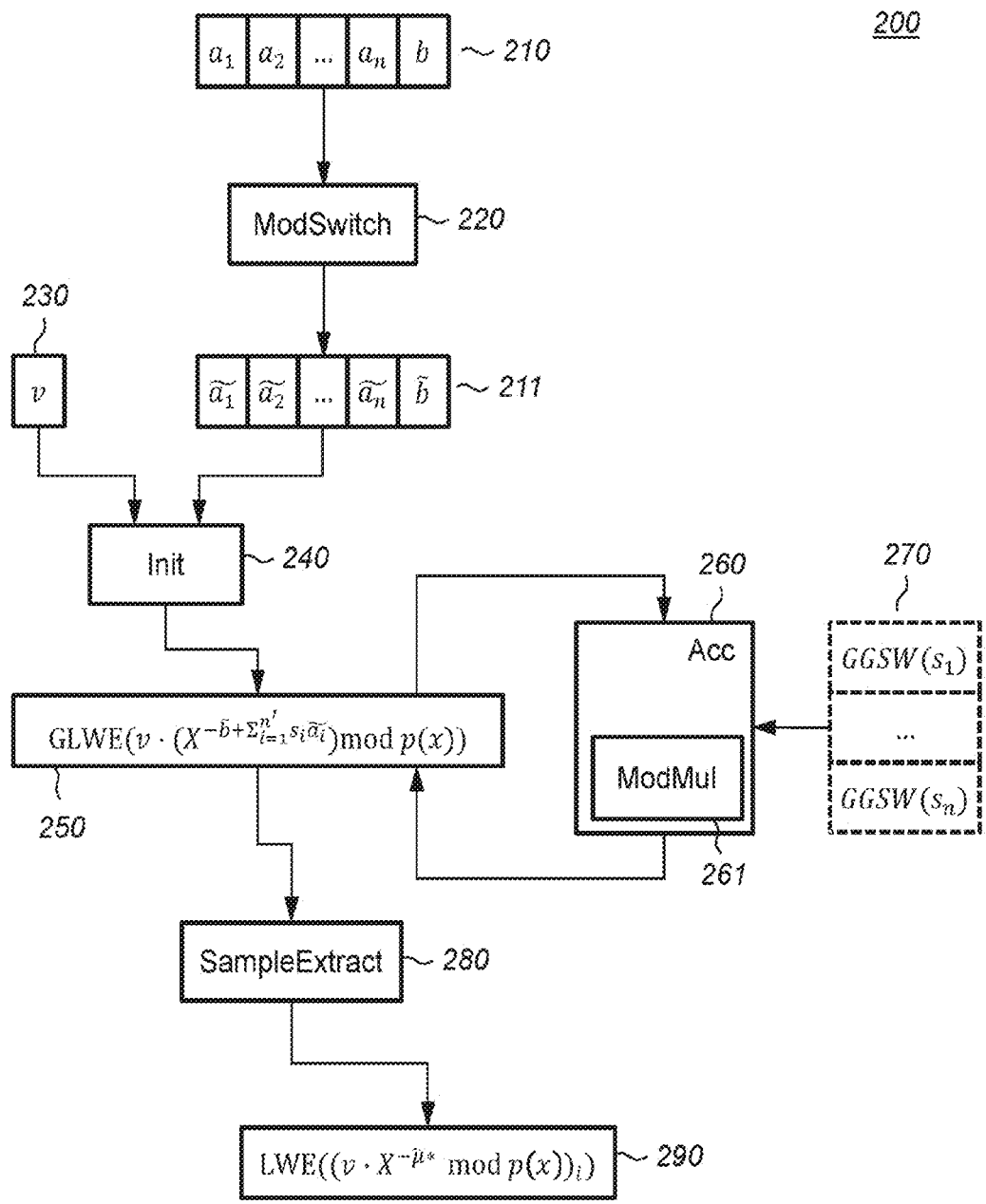
FIG. 2 schematically shows an example of an embodiment of a programmable bootstrapping unit.

FIG. 2 schematically shows an example of an embodiment of a programmable bootstrapping unit 200.

Shown in the figure is an LWE-type input ciphertext 210 comprising a number n of mask values $\bar{a}_i$ and a body value $\bar{b}$. The values are defined modulo a modulus q. Input ciphertext 210 may be denoted as $c \leftarrow \text{LWE}_s(\mu) \in (\mathbb{Z}/q\mathbb{Z})^{n+1}$.

In some cases, an input LWE ciphertext may be obtained by converting from an NTRU ciphertext. In other cases, no such conversion may be performed, e.g., the input LWE ciphertext can be computed based on an LWE-encrypted output of a programmable bootstrapping, without any NTRU encryption being used in this computation.

Further shown is a modulus switching unit 220. Modulus switching unit may be configured to perform a modulus switching on the input ciphertext 210 to obtain an LWE-type ciphertext 211. This may comprise scaling respective values of the input ciphertext 210 to the degree M of the NTT polynomial discussed below, e.g., by scaling by a factor M/q and then rounding. The modulus switching may be implemented as disclosed in the reference "Programmable bootstrapping enables . . . ". As a concrete example, the modulus switching may compute an encryption of a scaled plaintext value $$-\tilde{\mu}^* = -\tilde{b} + \sum_{j=1}^{n} s_j \tilde{a}_j (\mathrm{mod} M)$$

where $$\begin{cases} \tilde{b} = \left\lceil \frac{M(b \bmod q)}{q} \right\rfloor \\ \tilde{a}_j = \left\lceil \frac{M(a_j \bmod q)}{q} \right\rfloor & (1 \le j \le n) \end{cases}$$

Also shown are an initialization unit 240 and an accumulation unit 260. Units 240 and 260 may together be configured to perform a blind rotation of the LWE-type ciphertext 211. Units 240 and 260 may use GLWE encryptions modulo a modulus q and modulo a quotient polynomial p(X). Typically, the modulus q is the same as for LWE-type input ciphertext, but in principle this is not needed. Interestingly, the quotient polynomial p(X) may divide an NTT polynomial, e.g., $X^M-1$, that allows a number-theoretic transform modulo the modulus q. In particular, q may be a power of two, in which case a quotient polynomial different from $X^N+1$ may be used. Further examples are provided below.

The blind rotation may use a bootstrapping key 270. The bootstrapping key 270 may allow to perform a blind rotation of the LWE-type ciphertext 211.

The blind rotation may further use a test polynomial v, 230. The quotient polynomial may be unequal to $X^N+1$ as is used in the prior art, so that it is no longer possible to use a test polynomial that has respective desired output values as its respective coefficients. Interestingly, however, the test polynomial may be defined in such a way that the polynomial product $X^{-\tilde{\mu}^*} \cdot v$, modulo the modulus q and the quotient polynomial p(X), has desired output values for respective plaintext values as a fixed coefficient. In particular, the test polynomial v, 230 may be programmed as a look-up table so that $X^{-\tilde{\mu}^*} \cdot v$, up to drift, encodes $f(\mu)$ for a chosen function $f$.

The blind rotation may convert the scaled version 211 of the input ciphertext $c \leftarrow \mathrm{LWE}_s(\mu) \in (\mathbb{Z}/q\mathbb{Z})^{n+1}$ into an encrypted polynomial product 250 of the bootstrapping monomial $X^{-\tilde{\mu}^*}$ and the test polynomial v, 230 modulo the modulus q and modulo the quotient polynomial p(X). For example, the output may be a GLWE-type encryption $c' \leftarrow \mathrm{GLWE}_{s'}(X^{-\tilde{\mu}^*} \cdot v) \in \mathbb{Z}_{N,q}[X]^{k+1}$ encrypting the polynomial product $X^{-\tilde{\mu}^*} \cdot v$ under key $s' \in \mathbb{B}_N[X]^k$, where $\tilde{\mu}^*$ is a discretized value of the plaintext $\mu^* = \mu + e$ of ciphertext 210, and v is the test polynomial 230.

As shown in the figure, the blind rotation may be computed by performing a sequence of respective accumulation operations 260 with respect to GGSW encryptions GGSW ($s_i$) of the bootstrapping key 270 encrypting respective bits of the decryption key for the input ciphertext. The accumulation operation may selectively add a current random mask value of the LWE-type ciphertext 211 to a current GLWE encryption 250 depending on whether the bit of the bootstrapping key is set.

In particular, the blind rotation may be implemented as follows:

---

Algorithm. Blind rotation (binary case).

ACC ← (0, ... ,0, $X^{-\tilde{b}} \cdot v$)
for j = 1 to n do
   ACC ← CMux(bsk[j],ACC,$X^{\tilde{a}_j} \cdot$ ACC) // ACC ← ACC + bsk[j] ⊡ (($X^{\tilde{a}_j} - 1) \cdot$ ACC)
end for
return ACC

---

It may be noted that this algorithm indeed results in a GLWE encryption 250 of $X^{-\tilde{\mu}^*} \cdot v$ under key s'. This example uses n bootstrapping keys 270, bsk[j]←GGSW$_{s'}(s_j)$ for 1≤j≤n.

In this example, an initialization 240 is used that initially sets the GLWE encryption to an encryption of $X^{-\tilde{b}} \cdot v$. However, it is also possible to add the value $X^{-\tilde{b}} \cdot v$ to the GLWE encryption at another stage, e.g., after performing the accumulation operations 260.

Figure 3:
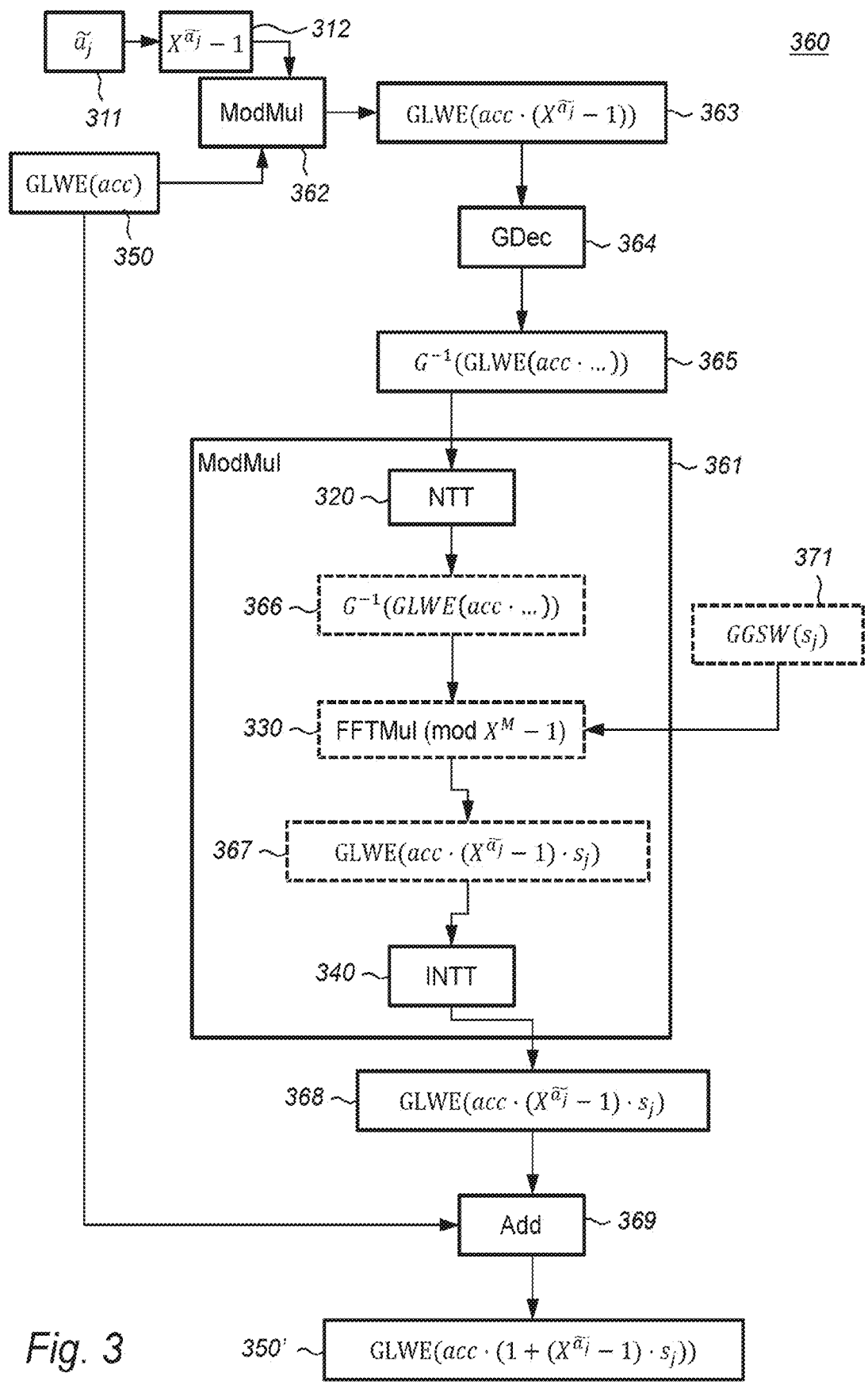
FIG. 3 schematically shows an example of an embodiment of an accumulation unit.

As also discussed with respect to FIG. 3, the accumulation unit 260 may compute an external product of a GLWE-type ciphertext 250 with a GGSW-type ciphertext 270, where computing the external product comprises performing polynomial multiplications. As shown in the figure, these polynomial multiplications may be performed more efficiently by computing them using a modular multiplication unit 261 that performs the polynomial multiplications using the number-theoretic transform.

This example uses a series of accumulation operations 260 with respect to a bootstrapping key 270 comprising GGSW encryptions of bits of the secret key, where the accumulation operation uses an external product. The provided techniques readily generalize to other variants of the blind rotation. Generally, any blind rotation that comprises computing an external product with GGSW encryptions of the bootstrapping key can be improved, for example, the blind rotation where bootstrapping key 270 contains non-binary digits as disclosed in European patent application EP21290025 (incorporated herein by reference), or a blind rotation that processes multiple key digits concurrently. Also in such cases, by performing the polynomial multiplications of the blind rotation by a unit 261 that uses the number-theoretic transform, performance may be improved. More generally, any polynomial multiplication performed as part of the blind rotation can be made more efficient by using the number-theoretic transform.

Also shown is a sample extraction unit 280. Sample extraction unit 280 may be configured to take as input the GLWE-encrypted polynomial product 250 having the desired output value as a fixed coefficient, and to perform a sample extraction to extract an LWE encryption 290 of this fixed coefficient from the encryption 250. For example, the sample extraction may be as known from the reference "Programmable bootstrapping enables . . . ".

Returning now to the way that the test polynomial 230 v is defined such that the encrypted polynomial product 250 has the desired output value as a coefficient. Interestingly, the inventors realized that it is possible to "program" the test polynomial to have this property for any quotient polynomial p(X) that divides NTT polynomial $X^M-1$.

In particular, the test polynomial $v \in R[X]/(p(X))$, 230, may be defined such that $X^{-\mu^*} \cdot v$ encodes the desired output value for the plaintext $\mu^*$ of ciphertext 211, and accordingly, up to drift, encodes $f(\mu)$ for a chosen function $f$ where $\mu$ is the plaintext of ciphertext 210. For example, the value $f(\mu)$ may be encoded as the constant coefficient of $X^{-\mu^*} \cdot v$. In this case, the test polynomial 230 may be determined by computing coefficients $v_i$ of v, 230, for all i<N such that the constant term of $X^{-t} v(X)$ is equal to $K_t$ for all $t \in \{0, \ldots, N-1\}$ for an arbitrary vector $K=(K_0, \ldots, K_{N-1}) \in R^N$ of respective desired output values.

Below, the following notation is used. Let R be a ring with identity. Consider the monic degree-N quotient polynomial $$p(X) = X^N + p_{N-1} X^{N-1} + p_{N-2} X^{N-2} + \ldots + p_0$$

defined over R, and such that p(X) divides an NTT polynomial $X^M-1$ for a certain given M. For convenience, let $p_N=1$ such that $p(X)=\Sigma_{j=0}^{N} p_j X^j$. For polynomial $v(X)=\Sigma_{i=0}^{N-1} v_i X^i$ in $R[X]/(p(X))$ denote by $(v(X))_i = v_i$ the degree-i coefficient of v(X) (in particular, $(v(X))_0 = v_0$ denotes the constant term), and $v_N=0$ for convenience.

The inventors were able to compute the test polynomial v based on the realization that $X^{-1}$ exists in $R[X]/(p(X))$ if the quotient polynomial p(X) divides the NTT polynomial $X^M-1$ for an M. Specifically, $X^{-1}$ can be expressed as a polynomial of degree<N with coefficients in R. This in turn enables, for a given polynomial $v(X)=\Sigma_{i=0}^{N-1} v_i X^i \in R[X]/(p(X))$, to obtain a formula for $X^{-1} v(X)$; namely, $X^{-1} v(X) = \Sigma_{i=0}^{N-1} (v_{i+1} + (-p_0)^{-1} p_{i+1} v_0) X^i$ as an element of $R[X]/(p(X))$.

In particular, it is noted that, in $R[X]/(p(X))$, it holds that $\Sigma_{j=1}^{N} p_j X^j = -p_0$ and, in turn, that $$(-p_0)^{-1} \sum_{j=1}^{N} p_j X^j = 1 \Leftrightarrow X^{-1} = (-p_0)^{-1} \sum_{j=0}^{N-1} p_j X^j.$$

This assumes that $p_0$ is invertible in R. This is implied by the fact that the quotient polynomial p(X) divides the NTT polynomial $X^M-1$. Indeed, writing $X^M-1=p(X) \cdot q(X)$ for a polynomial $q(X)=\Sigma_{i=0}^{M-N} q_i X^i \in R[X]$, it holds that $p_0 q_0 = -1$ or, equivalently, $p_0 (-q_0)=1$; hence, the inverse of $p_0$ exists and is given by $-q_0$.

Given a polynomial $v(X)=\Sigma_{i=0}^{N-1} v_i X^i \in [X]/(p(X))$, it may be verified that $$X^{-1} v(X) = \sum_{i=0}^{N-1} v_i X^{i-1}$$

$$= \left(\sum_{i=1}^{N-1} v_i X^{i-1}\right) + v_0 X^{-1}$$

$$= \left(\sum_{i=0}^{N-2} v_{i+1} X^i\right) + (-p_0)^{-1} v_0 \left(\sum_{i=1}^{N} p_i X^i\right) X^{-1}$$
$$\phantom{xxxxxxxxxxxxxxxxxxxxxxxxxxxxxxxxxxxxxxxxxxxxxxxxxxx} =-p_0$$

$$= \left(\sum_{i=0}^{N-2} v_{i+1} X^i\right) + (-p_0)^{-1} v_0 \left(\sum_{i=1}^{N} p_i X^{i-1}\right)$$

$$= \left(\sum_{i=0}^{N-2} v_{i+1} X^i\right) + (-p_0)^{-1} v_0 \left(\sum_{i=0}^{N-1} p_{i+1} X^i\right)$$

$$= \left(\sum_{i=0}^{N-2} (v_{i+1} + (-p_0)^{-1} p_{i+1} v_0) X^i\right) + (-p_0)^{-1} p_N v_0 X^{N-1}$$

$$= \sum_{i=0}^{N-1} (v_{i+1} + (-p_0)^{-1} p_{i+1} v_0) X^i$$

where the last inequality holds due to the definition $v_N=0$. Thus, the following holds:

$$X^{-1} v(X) = \sum_{i=0}^{N-1} (v_{i+1} + (-p_0)^{-1} p_{i+1} (v(X))_0) X^i. \quad (*)$$

Thus, effectively, a multiplication with $X^{-1}$ may lead to adding a scaled version of the constant term of v(X) to the other coefficients, where the scaling depends on the index of the coefficient, and a shift.

Based on the relation (*), test polynomial 230 can be computed. Several examples are given. Preferred embodiments include embedding a set of values either in the constant or in the leading coefficients of $X^{-t} v(X)$. In these examples, the inventors were able to derive expressions for the test polynomial that are particularly efficient to determine.

Example Test Polynomial 1: Fixed Coefficient is Constant Coefficient

Given a lookup table T with N desired output values $\{T[i]\}_{i=0}^{N-1}$, the test polynomial v(X), 230 is determined such that the constant term of $X^{-t} v(X)$ is $K_t = T[t]$. In this case, respective coefficients of $v(X) = X \Sigma_{i=0}^{N-1} v_i X^i \in R[X]/(p(X))$ can be computed from respective desired output values, e.g.:

$$v_i = \sum_{j=0}^{i} \frac{p_{i-j}}{p_0} K_j$$

for any $\{K_i \in \}_{i=0}^{N-1}$. It may be verified that $(X^{-t} v(X))_0 = K_t$ for all $t \in \{0, \ldots, N-1\}$.

For example, the following algorithm may be used to compute the test polynomial:

---
Algorithm. Programming the constant coefficient.

Input: $K = (K_0, \ldots, K_{N-1}) \in R^N$ with $K_i = T[i]$,
$p(X) = \Sigma_{i=0}^{N-1} p_i X^i$ such that $p(X) | X^M - 1$
Output: $v(X) = \Sigma_{i=0}^{N-1} v_i X^i \in R[X]/(p(X))$
for i = 0 to N - 1 do $$v_i \leftarrow \sum_{j=0}^{i} \frac{p_{i-j}}{p_0} K_j$$

end for
return $v(X) = \Sigma_{i=0}^{N-1} v_i X^i$

---

Example Test Polynomial 2: Fixed Coefficient is Leading Coefficient

Given a lookup table T with N desired output values $\{T[i]\}_{i=0}^{N-1}$, the test polynomial v(X), 230, is determined such that the leading coefficient of $X^{-t} v(X)$ is $K_t = T[t]$. In this case, respective coefficients of the test polynomial $v(X) = \Sigma_{i=0}^{N-1} v_i X^i \in [X]/(p(X))$ may be determined as sums of respective desired output values, e.g.:

$$v_i = \begin{cases} K_0 & \text{if } i = N-1 \\ -\sum_{j=0}^{i} p_{i-j} K_{j+1} & \text{otherwise} \end{cases}$$

for any $\{K_i \in \}_{i=0}^{N-1}$. It may be verified that $(X^{-t} v(X))_{N-1} = K_t$ for all $t \in \{0, \ldots, N-1\}$.

E.g., the following algorithm may be used to compute the test polynomial:

---
Algorithm. Programming the leading coefficient.

Input: $K = (K_0, \ldots, K_{N-1}) \in R^N$ with $K_i = T[i]$,
$p(X) = \Sigma_{i=0}^{N-1} p_i X^i$ such that $p(X)|X^M - 1$
Output: $v(X) = \Sigma_{i=0}^{N-1} v_i X^i \in R[X]/(p(X))$
$v_{N-1} \leftarrow K_0$
for i = 0 to N − 2 do
$\quad v_i \leftarrow -\Sigma_{j=0}^{i} p_{i-j} K_{j+1}$
end for
return $v(X) = \Sigma_{i=0}^{N-1} v_i X^i$

---

Example Test Polynomial 3: Quotient Polynomial is $X^N \pm X^{N/2} + 1$

In this example, the quotient polynomial p(X) is a trinomial of the form $p(X)=X^N+\epsilon X^{N/2}+1$ for even N and $\epsilon \in \{-1,1\}$. In particular, this means that $p_0=p_N=1$, $p_{N/2}=\pm 1$ and $p_i=0$ for all $i\in \{0, \ldots, N\}\setminus\{0,N/2,N\}$. For this choice of quotient polynomial, the test polynomial can be programmed efficiently for arbitrary fixed coefficient s, e.g., such that $K_t=(X^{-t}v(X))_s$, by determining respective coefficients as sums of at most two respective desired output values.

For example, for s<N/2, the coefficients may be computed as follows:

$$v_i = \begin{cases} -\epsilon K_{N/2+(i-s)} - K_{N+(i-s)} & \text{if } 0 \le i < s \\ K_{i-s} & \text{if } s \le i < \frac{N}{2} \\ -\epsilon K_{N/2+(i-s)} & \text{if } \frac{N}{2} \le i < \frac{N}{2}+s \\ \epsilon K_{(i-s)-N/2} + K_{i-s} & \text{if } \frac{N}{2}+s \le i < N \end{cases}.$$

It may be verified that, in this case, $(X^{-t} v(X))_s = K_t$ for all $t \in \{0, \ldots, N-1\}$.

The above relation may be derived as follows. Relation (*) may be specialized to this case as:

$$X^{-1}v(X) = -\epsilon(v(X))_0 X^{\frac{N}{2}-1} - (v(X))_0 X^{N-1} + \sum_{i=0}^{N-1} v_{i+1} X^i.$$

From this it may be deduced that:

$$(X^{-t}v(X))_i = \begin{cases} (X^{-t+1}v(X))_{N/2} - \epsilon(X^{-t+1}v(X))_0 & \text{if } i = \frac{N}{2}-1 \\ -(X^{-t+1}v(X))_0 & \text{if } i = N-1 \\ (X^{-t+1}v(X))_{i+1} & \text{otherwise} \end{cases}.$$

The following expressions for $(X^{-t} v(X))_s$ can be derived. For $$0 \le t < \frac{N}{2} - s:$$

$$(X^{-t}v(X))_s = (v(X))_{t+s}.$$

For $$\frac{N}{2} - s \le t < N - s,$$

this case can be handled by reducing to the above case:

$$(X^{-t}v(X))_s = \left(X^{-(N/2-s-1)} X^{-(t-N/2+s+1)} v(X)\right)_s$$
$$= \left(X^{-(t-N/2+s+1)} v(X)\right)_{N/2-1}$$
$$= \left(X^{-(t-N/2+s)} v(X)\right)_{N/2} - \epsilon \left(X^{-(t-N/2+s)} v(X)\right)_0$$
$$= (v(X))_{t+s} - \epsilon(v(X))_{t+s-N/2}.$$

And finally, for N−s≤t<N, again by reducing to the previous case:

$$(X^{-t}v(X))_s = \left(X^{-(N-s-1)} X^{-(t-N+s+1)} v(X)\right)_s$$
$$= \left(X^{-(t-N+s+1)} v(X)\right)_{N-1} - \epsilon \left(X^{-(t-N+s+1)} v(X)\right)_{N/2-1}$$
$$= -\left(X^{-(t-N+s)} v(X)\right)_0 - \epsilon\left(\left(X^{-(t-N+s)} v(X)\right)_{N/2}\right.$$
$$\left. -\epsilon\left(X^{-(t-N+s)} v(X)\right)_0\right)$$
$$= -\epsilon\left(X^{-(t-N+s)} v(X)\right)_{N/2}$$
$$= -\epsilon(v(X))_{t+s-N/2}$$

where it is used that $\epsilon^2=1$. Thus:

$$(X^{-t}v(X))_s = \begin{cases} (v(X))_{t+s} & \text{if } 0 \le t < \frac{N}{2}-s \\ (v(X))_{t+s} - \epsilon(v(X))_{t+s-N/2} & \text{if } \frac{N}{2}-s \le t < N-s \\ \epsilon(v(X))_{t+s-N/2} & \text{if } N-s \le t < N \end{cases}$$

The solution may be verified as follows:
Case 0≤t<N/2−s: This implies that $$s \le t+s \le \frac{N}{2}$$

and thus $$(X^{-t} v(X))_s = (v(X))_{s+t} = K_{(s+t)-s} = K_t.$$

Case N/2−s≤t<N/2: This corresponds to the second case of $(X^{-t} v(X))_s$ above, so:

$$(X^{-t} v(X))_s = (v(X))_{s+t} - \epsilon(v(X))_{t+s-N/2}.$$

The condition implies $$\frac{N}{2} \le s+t \le \frac{N}{2}+s \text{ and } 0 \le s+t-\frac{N}{2} \le s$$

and so $$(X^{-t} v(X))_s = -\epsilon K_{N/2+t} - \epsilon(-K_{N/2+t} - \epsilon K_t) = K_t.$$

Case $$\frac{N}{2} \leq t < N - s:$$

Again, this corresponds to the second case above, but this time $$\frac{N}{2} + s \leq t + s < N \text{ and } s \leq t + s - \frac{N}{2} < \frac{N}{2},$$

which yields $$(X^{-t} v(X))_s = \epsilon K_{t-N/2} + K_t - \epsilon K_{t-N/2} = K_t.$$

Case N−s≤t<N: In this case $$\frac{N}{2} \leq t + s - \frac{N}{2} < \frac{N}{2} + s,$$

and thus $$(X^{-t} v(X))_s = -\epsilon(v(X))_{t+s-N/2} = \epsilon^2 K_{N/2+(t+s-N/2-s)} = K_t.$$

As another example, for s≥N/2, the coefficients may be computed as follows:

$$v_i = \begin{cases} -K_{N-(s-i)} & \text{if } 0 \leq i < \frac{N}{2} \\ -\epsilon K_{N/2-(s-i)} - K_{N-(s-i)} & \text{if } \frac{N}{2} \leq i < s \\ K_{-(s-i)} & \text{if } s \leq i < N \end{cases}.$$

It may be verified that also in this case $(X^{-t} v(X))_s = K_t$ for all $t \in \{0, \ldots, N-1\}$.

For example, the following algorithm may be used to determine the test polynomial 230:

---

Algorithm. Programming the s-th coefficient of the test polynomial in $R[X]/(X^N + \epsilon X^{N/2} + 1)$.

Input:   K = ($K_0, \ldots, K_{N-1}$) ∈ $R^N$ with $K_i$ = T[i],
         $p(X) = X^N + \epsilon X^{N/2} + 1$ such that 2|N and $\epsilon \in \{-1, 1\}$, $0 \leq s < N$
Output:  $v(X) = \Sigma_{i=0}^{N-1} v_i X^i \in R[X]/(p(X))$
if s < N/2 then
    for i = 0 to s − 1 do $v_i \leftarrow \epsilon K_{N/2+(i-s)} − K_{N+(i-s)}$
    for i = s to N/2 − 1 do $v_i \leftarrow K_{i-s}$
    for i = N/2 to N/2 + s − 1 do $v_i \leftarrow -\epsilon K_{N/2+(i-s)}$
    for i = N/2 + s to N − 1 do $v_i \leftarrow \epsilon K_{(i-s)-N/2} + K_{i-s}$
else
    for i = 0 to N/2 − 1 do $v_i \leftarrow -K_{N-(s-i)}$
    for i = N/2 to s − 1 do $v_i \leftarrow -\epsilon K_{N/2-(s-i)} − K_{N-(s-i)}$
    for i = s to N − 1 do $v_i \leftarrow K_{-(s-i)}$
return $v(X) = \Sigma_{i=0}^{N-1} v_i X^i$

---

Example Test Polynomial 4. Other Quotient Polynomials/Coefficients

In general, in order to determine the test polynomial for other quotient polynomials, the approach of example 3 may be followed by writing out the explicit formulas for $((X^{-t} v(X)))_s$ for each value of t and solving the resulting system. This approach is preferred for sparse quotient polynomials, e.g., with at most 3, at most 5, or at most 10 nonzero coefficients.

Another way to determine the test polynomial is to view the multiplication of a polynomial v(X) by $X^{-1}$ in R[X]/(p(X)) as a matrix multiplication with the coefficient vector of v(X). This results in a system of N linear equations and N variables that can be solved using techniques that are known per se, with the solution corresponding to the coefficients of the test polynomial. The system in many cases is solvable; if not, for example, a next fixed coefficient can be selected to determine a test polynomial for.

Example Modulus/Quotient Polynomial/NTT Polynomial

Below, some particularly advantageous choices for the modulus, the quotient polynomial, and the NTT polynomial are discussed, that allow efficient polynomial multiplication using the number-theoretic transform.

Generally, the examples below consider polynomials over the ring $R = \mathbb{Z}/q\mathbb{Z}$ for different values of the integer q. The degree of the NTT polynomial M may be selected to be a power of three. The quotient polynomial may be set to the M-th cyclotomic polynomial $p(X) = X^N + X^{N/2} + 1$ as the quotient polynomial.

One particularly good choice that combines sufficient cryptographic security with efficient computations is $M = 3^7 = 2187$, and $N = 2 \cdot 3^6 = 1458$. Note that N/M = 2/3 > 1/2 so that this example enjoys the advantage that the blind rotation is able to deal with over half of input plaintext values.

Concretely, as also discussed above, for this quotient polynomial and given a lookup table of desired output values $K = (K_0, \ldots, K_{N-1}) \in R^N$, the values of K may be programmed in the constant coefficient of $X^{-t} v(X)$ as fixed coefficient. In this case, the coefficients of the test polynomial $v(X) = \Sigma_{i=0}^{N-1} v_i X^i$ may be determined as:

$$v_i = \begin{cases} K_i & \text{if } i < \frac{N}{2} \\ K_i + K_{i-N/2} & \text{otherwise} \end{cases}.$$

Prime Modulus

For example, as a number-theoretic transform, the regular number-theoretic transform may be used, e.g., as described in "Modern Computer Algebra" and as also discussed in more detail elsewhere in this specification. This number-theoretic transform is also known as the discrete Fourier transform. This allows to directly multiply polynomials in the ring $R[X]/(p(X)) = (\mathbb{Z}/q\mathbb{Z})[X]/(p(X))$ modulo the modulus and the quotient polynomial. The regular number-theoretic transform can be applied if the modulus q is selected such that $\mathbb{Z}/q\mathbb{Z}$ contains a primitive M-th root of unity. One way of ensuring this is by setting q to be a prime such that M divides q−1. The following are two examples of such primes of size 32 bits and 64 bits to match common data types:

$$\cdot 2^{31} < q = 0 \cdot 3^{18} + 1 < 2^{32}, \text{ and}$$

$$\cdot 2^{63} < q = 4 \cdot 3^{39} + < 2^{64}.$$

Corresponding M-th roots of unity for applying the NTT can be obtained, as known per se. For example, one can take $\omega=(1024)^{3^{18\cdot 7}} \bmod q$ for $q=10 \cdot 3^{18}+1$, and $\omega=(625)^{3^{39\cdot 7}} \bmod q$ for $q=4 \cdot 3^{39}+1$. These are both respective $3^7$-roots of unity.

Power-of-Two Modulus

As also discussed elsewhere, it is often very beneficial to choose a power-of-two modulus. Common choices are $q=2^{32}$ or $q=2^{64}$. If M is chosen to be a power of three, then M and q are co-prime. The regular NTT cannot be applied directly as number-theoretic transform in this case, since $\mathbb{Z}/q\mathbb{Z}$ does not contain a primitive M-th root of unity. (Specifically, $\mathbb{Z}/q\mathbb{Z}$ cannot contain an element of order M, since for this M needs to divide the order of the group of units of $\mathbb{Z}/q\mathbb{Z}$, which is q/2 if q is a power of two.) However, other number-theoretic transforms can be applied in this setting, for example, Schönhage's algorithm or Nussbaumer's algorithm can be used. The same is true for other choices of M such that M is a unit in $\mathbb{Z}/q\mathbb{Z}$.

FIG. 3 schematically shows an example of an embodiment of an accumulator unit 360, for example for use in the blind rotation of FIG. 2.

Accumulator unit 360 may be configured to perform an accumulation operation that selectively adds a current random mask value 311 of an LWE-type ciphertext to a current GLWE encryption 350, depending on whether a GGSW-encrypted current bit 371 of a bootstrapping key is set.

Accumulator unit 360 may be configured to obliviously select either the current GLWE encryption 350, or the current GLWE encryption multiplied by a monomial representing the current random mask value 311, depending on whether the current bit 371 of the bootstrapping key is set. Such an operation that obliviously selects a first or second GLWE ciphertext is also known as a controlled selector gate or controlled multiplexer operation, CMux. Generally, given a GGSW ciphertext C encrypting a bit b∈{0,1} and two GLWE ciphertexts $c_0$ and $c_1$, the CMux operation may output a ciphertext encrypting the same plaintext as $c_b$, $$c' \leftarrow CMux(C, c_0, c_1) := c_0 + C \boxdot (c_1 - c_0)$$

where $\boxdot$ denotes the external product of ciphertexts. A detailed example is given in "Programmable bootstrapping enables efficient homomorphic inference of deep neural networks". In the present case, the accumulator unit may compute CMux(bsk[j],ACC,$X^{\tilde{\alpha}_j}$·ACC), where ACC is the current GLWE encryption 350, $\tilde{\alpha}_j$ is the current random mask value 311, and bsk[j] is the GGSW-encrypted current bit 371.

To perform the oblivious selection between the two GLWE encryptions, accumulator unit 360 may compute a GLWE-encrypted difference 363 between the desired output if the bit 371 is set and the desired output if the bit 371 is not set. The difference 363 may be performed by computing a polynomial multiplication ModMul, 362. The polynomial multiplication may multiplying the current GLWE encryption ACC, 350, by a polynomial, e.g., $X^{\tilde{\alpha}_j}-1$, 312, derived from the current random mask value 311, e.g., using the notation above, $(X^{\tilde{\alpha}_j}-1)\cdot$ACC may be computed. The polynomial multiplication 362 is typically performed in the coefficient domain representation of the polynomials, not the Fourier domain representation of the number-theoretic transform.

Given the encrypted difference 363, the accumulator unit 360 may compute an external product of the difference with the GGSW-encrypted bit 371. This may result in a GLWE encryption 368 that encrypts zero if the encrypted bit 371 is zero and the difference 363 if the bit is one.

As is known per se, performing such an external product of a GLWE encryption 363 and a GGSW encryption 371 may comprise computing multiple respective polynomial products. Generally, a GGSW encryption 371 of a given plaintext may comprise multiple respective GLWE encryptions of values that depend on the plaintext. As an example, a GGSW encryption $TGGSW_{s'}(m)$ as described in "Programmable bootstrapping enables efficient homomorphic inference of deep neural networks" may be considered to comprise respective GLWE-type encryptions $$c \leftarrow TGGSW_{s'}(m) = \left(TGLWE_{s'}\left((-s'_{h(r)})m \cdot \frac{1}{B^{b(r)}}\right)\right)_{1 \le r \le (k+1)\ell}$$

for respective values h(r), see also the definition of TGGSW encryption given in I. Chillotti et al., "CONCRETE: Concrete Operates oN Ciphertexts Rapidly by Extending TfhE" (available at https://homomorphicencryption.org/wp-content/uploads/2020/12/wahc20_demo_damien.pdf and incorporated herein by reference).

In particular, computing the external product may comprise computing a gadget decomposition GDec, 364, of the GLWE encryption 363, as known per se. The gadget decomposition may result in a vector 365 of polynomials defined based on the GLWE encryption 363. The gadget decomposition is typically computed on polynomials in coefficient representation. The external product may be computed by multiplying the gadget decomposition vector 365 by the GGSW encryption 371 considered as a matrix of polynomials. The matrix multiplication may be computed modulo the modulus q and the quotient polynomial q(x) as described herein, and may accordingly comprise polynomial multiplications of respective polynomials based on the GLWE encryption 363, and polynomials of the GGSW encryption 371.

Interestingly, these polynomial multiplications can be performed efficiently using the number-theoretic transform. To this end, the gadget decomposition 365, which is typically computed 364 in coefficient representation, may be converted to a Fourier domain representation by applying the number-theoretic transform NTT, 320. The result is the gadget decomposition 366 in the Fourier-domain representation, shown with dashes in the figure. The gadget decomposition 366 may then be multiplied with the GGSW encryption 371, also in Fourier-domain representation, by applying a Fourier-domain polynomial multiplication FFTMul, 330. This multiplication 330 may comprise pointwise multiplying evaluations of the respective polynomials in a set of evaluation points, as also discussed in more detail elsewhere. The result may be the GLWE encryption 367 resulting from the external product, in Fourier-domain representation. By converting the Fourier-domain representation 367 back using an inverse INTT, 340, of the number-theoretic transform, the GLWE encryption may be obtained in coefficient representation 368.

As shown in the figure, the GGSWencryption 371 may be obtained in Fourier-domain represented form, e.g., may be received from another party or from storage in Fourier domain representation. It is also possible to convert to the Fourier-domain represented form by applying an NTT 320 as part of the accumulation 360, however.

A detailed example is now given of converting to, 320 and from, 340 the Fourier-domain representation, and performing polynomial multiplication 330 in the Fourier domain. This example shows the discrete Fourier transform, also sometimes referred to as the "regular", or "standard", number-theoretic transform.

In this example, let R be a ring with unity. Let also $\omega \in$ be a primitive M-th root of unity for an integer M>1. It is described how to multiply two polynomials f, g∈R[X]/($X^M-1$) modulo an NTT polynomial $X^M-1$. This is known per se, e.g., from chapter 8 of "Modern Computer Algebra".

Polynomial f:=f(X)=$f_0+f_1 X+ \ldots +f_{M-1}X^{M-1} \in R[X]$ of degree<M may be represented in coefficient form as coefficient vector, e.g., $(f_0, f_1, \ldots, f_{M-1}) \in R^M$. The discrete Fourier transform of polynomial f (viewed as a vector of $R^M$) may comprise evaluations of f at respective powers of $\omega$, e.g.:

$$DFT_\omega : R^M \to R^M, \quad (1)$$
$$f \mapsto DFT_\omega(f) = (f(\omega^j))_{0 \leq j \leq M-1}.$$

For two polynomials f, g∈R[X] of degree<M, it holds that $$DFT_\omega(f * g) = DFT_\omega(f) \cdot DFT_\omega(g)$$

where * denotes polynomial convolution and · denotes the point-wise multiplication of vectors.

Given polynomials f,g∈R[X]/($X^M-1$) of degree<M, since multiplication modulo $X^M-1$ is a convolution (e.g., fg=f*g (mod $X^M-1$)), the polynomial product h:=fg∈R[X]/($X^M-1$) may in this example be obtained by applying DFT 320, pointwise multiplication 330, and inverse DFT 340 as:

$$h = DFT_\omega^{-1}(DFT_\omega(f) \cdot DFT_\omega(g))$$

where $DFT_\omega^{-1}$ denotes the inverse discrete Fourier transform. Interestingly, it holds that $$DFT_\omega^{-1}(h) = \frac{1}{M} DFT_{\omega^{-1}}(h),$$

for any polynomial h∈R[X] of degree<M.

Generally, given a quotient polynomial q(X) dividing the NTT polynomial $X^M-1$, the polynomial product modulo the quotient polynomial may be obtained by computing h(X) mod q(X).

For some quotient polynomials q(X), it is possible to perform NTT-based polynomial multiplication particularly efficiently, e.g., based on a Fourier-domain representation with a number of elements equal to the degree of q(X) rather than the degree of the NTT polynomial. In such cases, the Fourier-domain representation may comprise only a subset of the set of powers of the primitive M-th root of unity.

For example, given f,g∈R[X]/($X^N+X^{N/2}+1$), write f(X)= $\Sigma_{j=0}^{N-1} f_j X^j$ with $f_j \in R$ and g(X)=$\Sigma_{j=0}^{N-1} g_j X^j$ with $g_j \in R$. For i∈{1,2}, define $f_i^*(X)=f(\omega^i X)$ and $g_i^*(X)=g(\omega^i X)$. Noting that $\omega^M-1=(\omega^{N/2}-1)(\omega^{N/2}+N1)=0$, it follows that $\omega^N+\omega^{N/2}+1=0$, since $\omega$ is a primitive (3N/2)-th root of unity, and polynomial $X^N+X^{N/2}+1$ can be expressed as $X^N+X^{N/2}+1=(X^{N/2}-\omega^{N/2})(X^{N/2}-\omega^N)=(\omega^2 X)^{N/2}-1)(\omega X)^{N/2}-1)$. Hence, it may be seen that:

$$f_1^*(X) \bmod (X^{N/2} - 1)$$
$$= f_0 + f_1 \omega X + \ldots + f_{N-1}\omega^{N-1} X^{N-1} \bmod (X^{N/2} - 1)$$
$$= \sum_{j=0}^{N/2-1} f_{1,j}^* X^j \text{ with } f_{1,j}^* = f_j\omega^j + f_{N/2+j}\omega^{N/2+j} \in R$$

and $$f_2^*(X) \bmod (X^{N/2} - 1)$$
$$= f_0 + f_1 \omega^2 X + \ldots + f_{N-1}(\omega^2)^{N-1} X^{N-1} \bmod (X^{N/2} - 1)$$
$$= \sum_{j=0}^{N/2-1} f_{2,j}^* X^j \text{ with } f_{2,j}^* = f_j\omega^{2j} + f_{N/2+j}\omega^{N+2j} \in R.$$

Similarly, it holds that $g_1^*(X) \bmod (X^{N/2}-1)=\Sigma_{j=0}^{N/2-1} X^j$ with $g_{1,j}^*=g_j\omega^j+g_{N/2+j}\omega^{N/2+j}\in R$ and $g_2^*(X) \bmod (X^{N/2}-1)=\Sigma_{j=0}^{N/2-1} X^j$ with $g_{2,j}^*=g_j\omega^{2j}+g_{N/2+j}\omega^{N+2j}\in R$.

Let $\eta:=\omega^3$, which is a primitive (N/2)-th root of unity. For i∈{1,2}, $h_i^*:=f_i^*g_i^* \bmod (X^{N/2}-1)$ may be computed as:

$$h_i^* = DFT_\eta^{-1}(DFT_\eta(f_i^*) \cdot DFT_\eta(g_i^*)).$$

Polynomials $h_i:=f_i g_i \bmod ((\omega^{3-i}X)^{N/2}-1)$ may be recovered as:

$$h_i(X) = \sum_{j=0}^{N/2-1} h_{i,j} X^j \text{ with } h_{i,j} = h_{i,j}^*(\omega^i)^{-j} \in R$$

for i∈{1,2}. Applying the Chinese remainder theorem can yield the product polynomial h:=fg∈R[X]/($X^N+X^{N/2}+1$) as $$h(X) =$$
$$h_1(X) + (\omega^N X^{N/2} - 1)\left(\frac{1}{\omega^{N/2}-1}(h_2(X) - h_1(X))\bmod(\omega^{N/2}X^{N/2}-1)\right).$$

Accordingly, in this case, the number-theoretic transform operation 320 may be implemented as $\overline{DFT}_\omega$, taking as input a polynomial 365 in R[X]/($X^N+X^{N/2}+1$) and returning its Fourier representation 366. For example, given f∈R[X]/($X^N+X^{N/2}+1$), the Fourier representation may be computed as $$\overline{DFT}_\omega(f) = (DFT_\eta(f_1^*), DFT_\eta(f_2^*))$$

where $\eta=\omega^3$; or, equivalently, $$\overline{DFT}_\omega : R^N \to R^N,$$

$$f \mapsto \overline{DFT}_\omega(f) = \left( \left( f(\omega^{3j+1}) \right)_{0 \le j \le N/2-1}, \left( f(\omega^{3j+2}) \right)_{0 \le j \le N/2-1} \right).$$

The inverse operation 340 may be denoted $\overline{DFT}_\omega^{-1}$, with multiplication 330 being implemented as $DFT_\eta(f_i^*) \cdot DFT_\eta(g_i^*)$, i=1,2.

In the above example, a primitive Mth root of unity was used, with M the degree of the NTT polynomial. It is also possible to implement the number-theoretic transform under the sole condition that M is a unit in $\mathbb{Z}/q\mathbb{Z}$. For example, the number-theoretic transform can be implemented using Schönhage's algorithm, e.g., see "Modern Computer Algebra", Algorithm 8.30, or using Nussbaumer's algorithm, e.g., see "Modern Computer Algebra", Exercise 4.6.4.59. Further implementations of the number-theoretic transform are disclosed e.g. in D. Bernstein, "Multidigit multiplication for mathematicians", unpublished manuscript, available at https://cr.yp.to/papers.html#m3, August 2001 (incorporated herein by reference); and H. Nussbaumer, "Fast polynomial transform algorithms for digital convolution", IEEE Transactions on Acoustics, Speech, and Signal Processing, 28(2): 205-215, 1980 (incorporated herein by reference).

The GLWE encryption 368 may be homomorphically added Add, 369, to the current GLWE encryption 350 to obtain GLWE encryption 350' representing the output of the accumulator unit, e.g., ACC←ACC+bsk[j]⊡((X$^{\alpha j}$−1)·ACC), or equivalently, ACC←CMux(bsk[j],ACC, X$^{\alpha j}$·ACC).

Variations of the above technique are possible, e.g., the role of zero and one in the encryption key 371 can be reversed by appropriately adapting the difference 363 and the value added to the GLWE encryption 368; addition 369 may be performed in the Fourier domain; etcetera. Also in such other cases, generally the accumulator unit 360 may compute an external product of a GLWE-type ciphertext with a GGSW-type ciphertext of the bootstrapping key, which may be made more efficient by using the number-theoretic transform for its polynomial multiplications as discussed above.

In the examples of FIG. 2 and FIG. 3, the proposed techniques are explained based on (G)LWE encryption, and its gadget variant GGSW. In particular, in the above examples, the ciphertext 211 to which the blind rotation is applied is a LWE ciphertext, the encrypted polynomial product 250 of the blind rotation is a GLWE encryption, and the accumulator is implemented using GGSW encryptions of a bootstrapping key.

However, it is not necessary to use LWE, and in particular, it is possible to use NTRU-type encryptions for the input ciphertext 211 and/or for the encrypted polynomial product 250. In the latter case, the bootstrapping key may comprise gadget NTRU encryptions. More generally, the provided techniques can be applied to any bind rotation that results in an encrypted polynomial product of a test polynomial and a bootstrapping polynomial modulo a quotient polynomial different from $X^M+1$, e.g., any accumulator-based blind rotation.

In particular, concerning the use of NTRU for the encrypted polynomial product 250, it is noted that the discussed "Blind rotation" algorithm per se makes use of an abstract accumulator ACC. While, as discussed, this accumulator can be implemented based on GLWE, this is not necessary. Other types of accumulators are possible, for example based on NTRU. Based on NTRU ciphertexts, a gadget encryption analogous to GGSW encryption can be defined and with it, an external product. A detailed example can be found in C. Bonte et al., "FINAL: Faster FHE instantiated with NTRU and LWE", https://ia.cr/2022/074. Accordingly, the accumulator may be implemented based on NTRU, where its value may for example contain an element in $\mathbb{Z}_{N,q}[X]$ and CMux may be defined as discussed with respect to FIG. 3.

As an example, applying the blind rotation to an LWE ciphertext c encrypting y using this type of NTRU-based accumulator may result in an encrypted polynomial product $X^{-\tilde{\mu}^*} \cdot v$ of bootstrapping monomial $X^{-\tilde{\mu}^*}$ and test polynomial v. In this case, the encrypted polynomial may be a NTRU ciphertext of the form $c'=g/f+X^{-\tilde{\mu}^*} \cdot v$. Using an appropriate key-switching key, an LWE ciphertext encrypting the constant term of $X^{-\tilde{\mu}^*} \cdot v$ can optionally be extracted from this encrypted polynomial, as discussed in the "FINAL" reference.

Instead or in addition to the encrypted polynomial, also the input ciphertext 211 need not be an LWE-type ciphertext. In particular, a blind rotation can be applied to a NTRU-type ciphertext, as discussed in the "FINAL" reference. It is also possible to obtain an input LWE ciphertext 211 by converting it from a NTRU ciphertext, as discussed in the "FINAL" reference.

Also in such cases, it is desired to define the test polynomial v such that the encrypted polynomial product $X^{-\tilde{\mu}^*} \cdot v$ contains a desired output value at a fixed coefficient. Also in the case of NTRU, the provided techniques allow a test polynomial to be defined for various choices of the quotient polynomial different from $X^M+1$ are used.

Figure 4:
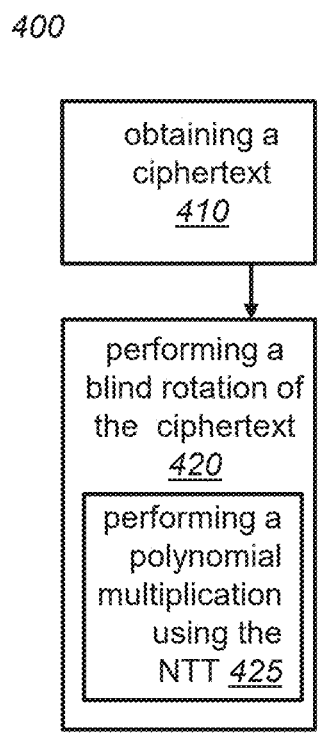
FIG. 4 schematically shows an example of an embodiment of an encrypted computation method.

FIG. 4 schematically shows an example of an embodiment of an encrypted computation method 400. Encrypted computation method 400 may be computed-implemented.

The method 400 may comprise obtaining 410 an, e.g. LWE-type, ciphertext encrypting a plaintext value.

The method 400 may further comprise performing 420 a blind rotation of the ciphertext according to a test polynomial. The blind rotation may result in an encrypted polynomial product of the test polynomial and a bootstrapping monomial modulo a modulus q and modulo a quotient polynomial p(X). The bootstrapping monomial may represent the plaintext value as an exponent. The quotient polynomial p(X) may divide an NTT polynomial, e.g., $X^M-1$ that allows a number-theoretic transform modulo the modulus q. Performing the blind rotation may comprise performing 425 a polynomial multiplication using the number-theoretic transform. The test polynomial may be defined such that the polynomial product has a desired output value for the plaintext value as a fixed coefficient.

Figure 5:
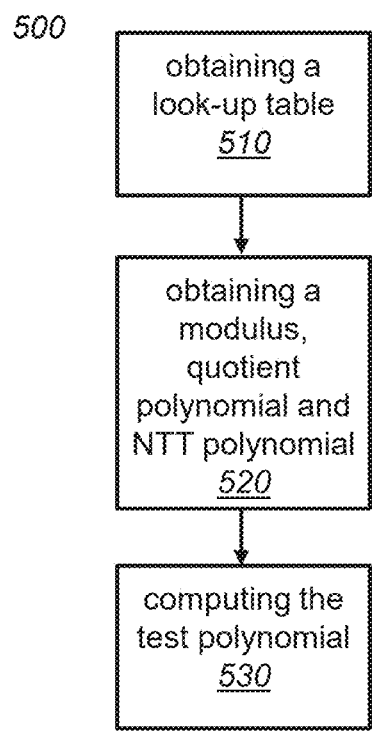
FIG. 5 schematically shows an example of an embodiment of a method of determining a test polynomial for use in an encrypted computation.

FIG. 5 schematically shows an example of an embodiment of a method 500 of determining a test polynomial. The method 500 may be computer-implemented.

The test polynomial may be for use in an encrypted computation as described herein. The encrypted computation method may comprise computing a polynomial product of a bootstrapping monomial and a test polynomial modulo a modulus q and modulo a quotient polynomial p(X). The quotient polynomial p(X) may divide an NTT polynomial.

The method 500 may comprise obtaining 510 a lookup table defining desired output values for respective plaintext values. The method 500 may comprise obtaining 520 the modulus, the quotient polynomial, and the NTT polynomial. The method 500 may comprise computing 530 the test polynomial such that the polynomial product has the respective desired output values as a fixed coefficient for the respective plaintext values.

Many different ways of executing the method(s) 400, 500 are possible, as will be apparent to a person skilled in the art. For example, the order of the steps can be performed in the shown order, but the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started. It is also possible to combine the methods 400, 500, e.g., method 400 of performing an encrypted computation using a test polynomial may be performed following the computation of the test polynomial according to method 500.

Embodiments of the methods may be executed using software, which comprises instructions for causing a processor system to perform method 400 or 500. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the presently disclosed subject matter also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the devices, units and/or parts of at least one of the systems and/or products set forth.

Typically, the devices described herein, e.g., in FIG. 1a-1c, comprise one or more microprocessors which executes appropriate software stored at the system; for example, that software may have been downloaded and/or stored in a corresponding memory, e.g., a volatile memory such as RAM or a non-volatile memory such as Flash. Alternatively, the systems may, in whole or in part, be implemented in programmable logic, e.g., as field-programmable gate array (FPGA). The systems may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc. In particular, the systems may comprise circuits for the evaluation of cryptographic primitives.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Figure 6:
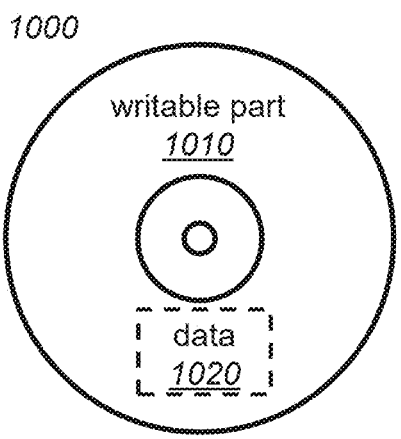
FIG. 6 schematically shows a computer readable medium having a writable part comprising a computer program according to an embodiment.

FIG. 6 shows a computer readable medium 1000 having a writable part 1010. Computer readable medium 1000 is shown in the form of an optically readable medium. Computer readable medium 1000 may store data 1020 wherein the data may indicate instructions, which when executed by a processor system, cause a processor system to perform an embodiment of a method of performing an encrypted computation method, and/or a method of determining a test polynomial, according to an embodiment.

Instead or in addition, the data 1020 may represent a test polynomial for use in the encrypted computation method according to an embodiment. The test polynomial may have been previously determined according to an embodiment.

The data 1020 may be embodied on the computer readable medium 1000 as physical marks or by magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said method of performing a computation on encrypted values, e.g., LWE-encrypted values, or of determining a test polynomial.

Figure 7:
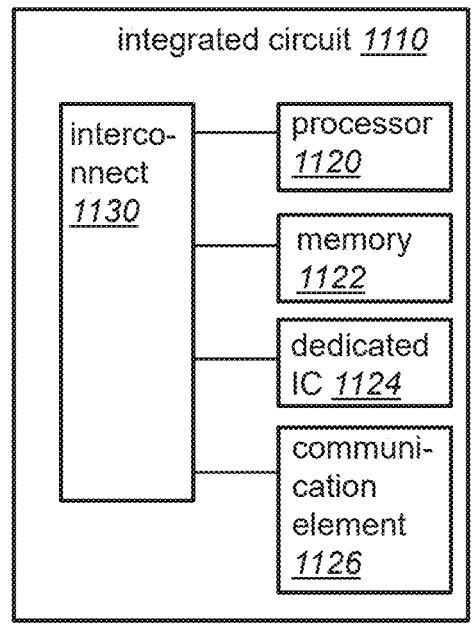
FIG. 7 schematically shows a representation of a processor system according to an embodiment.

FIG. 7 shows in a schematic representation of a processor system 1140 according to an embodiment of a device for performing an encrypted computation or determining a test polynomial. The processor system comprises one or more integrated circuits 1110. The architecture of the one or more integrated circuits 1110 is schematically shown in the figure. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the device for performing the encrypted computation or determining the test polynomial, may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

While device 1110 is shown as including one of each described component, the various components may be duplicated in various embodiments. For example, the processor 1120 may include multiple microprocessors that are configured to independently execute the methods described herein or are configured to perform steps or subroutines of the methods described herein such that the multiple processors cooperate to achieve the functionality described herein. Further, where the device 1110 is implemented in a cloud computing system, the various hardware components may belong to separate physical systems. For example, the processor 1120 may include a first processor in a first server and a second processor in a second server.

It should be noted that the above-mentioned embodiments illustrate rather than limit the presently disclosed subject matter, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The presently disclosed subject matter may be implemented by hardware comprising several distinct elements, and by a suitably programmed computer. In the device claim enumerating several parts, several of these parts may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A computer-implemented cryptographic method for outsourcing computations, the computations comprising performing a blind rotation of a ciphertext, the method comprising:
   receiving input data in encrypted form over a communication interface;
   obtaining the ciphertext from the input data, the ciphertext encrypting a plaintext value;
   performing a blind rotation of the ciphertext according to a test polynomial, wherein the blind rotation results in an encrypted polynomial product of the test polynomial and a bootstrapping monomial modulo a modulus and modulo a quotient polynomial, wherein the bootstrapping monomial represents the plaintext value as an exponent;
   outputting the encrypted polynomial product; and
   returning a computation result in encrypted form over the communication interface and/or store the computation result on a storage device, the computation result being obtained from the encrypted polynomial product; wherein
   the quotient polynomial divides a number-theoretic transform (NTT) polynomial that allows a number-theoretic transform modulo the modulus; and wherein
   performing the blind rotation comprises performing a polynomial multiplication using the number-theoretic transform; and the test polynomial is defined such that the encrypted polynomial product has a desired output value for the plaintext value as a fixed coefficient.

2. The method of claim 1, wherein the ciphertext is a Learning With Errors-type (LWE-type) ciphertext.

3. The method of claim 2, wherein the ciphertext is obtained by conversion from a NTRU-type ciphertext.

4. The method of claim 1, wherein the ciphertext is an NTRU-type ciphertext.

5. The method of claim 1, comprising performing a programmable bootstrapping by:
   obtaining an input ciphertext;
   performing a modulus switching on the input ciphertext to obtain a further ciphertext, the further ciphertext encrypting the plaintext value;
   performing the blind rotation; and
   performing a sample extraction to extract an encryption of the fixed coefficient from the encrypted polynomial product.

6. The method of claim 1, wherein performing the blind rotation comprises computing an external product of a ciphertext with a gadget ciphertext comprised in a bootstrapping key, wherein polynomial multiplications of computing the external product are performed using the number-theoretic transform polynomial.

7. The method of claim 1, wherein the quotient polynomial is not equal to $X^N+1$.

8. The method of claim 1, wherein the degree of the quotient polynomial is strictly larger than half the degree of the NTT polynomial.

9. The method of claim 1, wherein the modulus is a power of two.

10. The method of claim 1, wherein the modulus is prime and the degree of the NTT polynomial divides the modulus minus one.

11. The method of claim 10, wherein the modulus is equal to $10\cdot 3^{18}+1$ or $4\cdot 3^{39}+1$.

12. The method of claim 1, wherein the quotient polynomial is equal to $X^N+X^{N/2}+1$ or $X^N-X^{N/2}+1$.

13. The method of claim 1, wherein the degree of the NTT polynomial is a power of three, and the degree of the quotient polynomial is two thirds of the degree of the NTT polynomial.

14. The method of claim 1, wherein the fixed coefficient is a constant coefficient of the encrypted polynomial product or a leading coefficient of the encrypted polynomial product.

15. A computer-implemented computation method of determining a test polynomial for use in the computer-implemented cryptographic method for outsourcing computations according to claim 1, wherein the cryptographic encrypted computation method comprises computing an encrypted polynomial product of a bootstrapping monomial and a test polynomial modulo a modulus and modulo a quotient polynomial and wherein the quotient polynomial divides a number-theoretic transform (NTT) polynomial, the computer-implemented computation method comprising:
   obtaining a lookup table defining desired output values for respective plaintext values;
   obtaining the modulus, the quotient polynomial, and the NTT polynomial; and
   computing the test polynomial such that the encrypted polynomial product has the respective desired output values as a fixed coefficient for the respective plaintext values.

16. A cryptographic encrypted computation device for outsourcing computations, the computations comprising performing blind rotations on ciphertexts, the device comprising:
- a storage for storing a ciphertext, the ciphertext encrypting a plaintext value; and
- a processor subsystem configured to receive input data in encrypted form over a communication interface, obtain the ciphertext from the input data, the ciphertext encrypting a plaintext value, and perform a blind rotation of the ciphertext according to a test polynomial, wherein
- the blind rotation results in an encrypted polynomial product of the test polynomial and a bootstrapping monomial modulo a modulus and modulo a quotient polynomial, wherein the bootstrapping monomial represents the plaintext value as an exponent; and wherein
- the processor subsystem is further configured to output the encrypted polynomial product; and wherein:
- the quotient polynomial divides a number-theoretic transform (NTT) polynomial that allows a number-theoretic transform modulo the modulus;
- performing the blind rotation comprises performing a polynomial multiplication using the number-theoretic transform; and
- the test polynomial is defined such that the encrypted polynomial product has a desired output value for the plaintext value as a fixed coefficient, and return a computation result in encrypted form over the communication interface and/or store the computation result on the storage device, the computation result being obtained from the encrypted polynomial product.

17. A device for determining a test polynomial for use in the computer-implemented cryptographic method for outsourcing computations according to claim 1, wherein the cryptographic encrypted computation method comprises computing an encrypted polynomial product of a bootstrapping monomial and a test polynomial modulo a modulus and modulo a quotient polynomial and wherein the quotient polynomial divides a number-theoretic transform (NTT) polynomial, the device comprising:
- a storage for storing a lookup table defining desired output values for respective plaintext values; and
- a processor subsystem configured to:
  - obtain the modulus, the quotient polynomial, and the NTT polynomial; and
  - compute the test polynomial such that the encrypted polynomial product has the respective desired output values as a fixed coefficient for the respective plaintext values.

18. A non-transitory computer-readable storage medium comprising data representing:
- instructions which, when executed by a processor system, cause the processor system to perform the computer-implemented cryptographic method for outsourcing computations according to claim 1.

19. A non-transitory computer-readable storage medium comprising data representing:
- instructions which, when executed by a processor system, cause the processor system to perform the computer-implemented computation method according to claim 15.

20. The method of claim 1, wherein the outsourced computations comprise a circuit evaluation, that are performed over encrypted data by the computer without that computer being able to decrypt the encrypted data.

21. The method of claim 1, wherein intermediate data of the computations, including an internal state of the computation, are in encrypted form.

22. The method of claim 1, wherein after returning the computation result in encrypted form, the computation results are decrypted, and wherein the decrypted computation results are the same as if the computations had been performed on unencrypted input data corresponding to the encrypted input data.

23. A method of claim 1, wherein the method is implemented on a computer of a cloud provider.

24. The method of claim 1, wherein input data is received from and returned to a data provider device, the method is implemented on an encrypted computing device, the encrypted computing device performs the required computations on encrypted data, wherein the encrypted computing device is unable to obtain plain data corresponding to the encrypted input data.

25. The method of claim 24, wherein the data provider device uses an encryption key to encrypt the input data, and, when computation results are received by the data provider from the encrypted computing device, the data provider device uses a decryption key corresponding to the encryption key to decrypt the received encrypted computation results.

26. The method of claim 1, wherein the outsourced computations comprise one or more of: training machine-learning models, training image classifiers, training medical models, performing linear regression, performing backpropagation, evaluating a neural network on encrypted inputs, classifying medical data, looking up encrypted data in an encrypted database, computing a control signal.

* * * * *